(12) United States Patent
Aspler-Yaskil et al.

(10) Patent No.: US 12,476,819 B2
(45) Date of Patent: Nov. 18, 2025

(54) VERIFICATION SYSTEM FOR PROVING AUTHENTICITY AND OWNERSHIP OF DIGITAL ASSETS

(71) Applicant: PayPal, Inc., San Jose, CA (US)

(72) Inventors: Rivka Aspler-Yaskil, Hod Hasharon (IL); Mehak Jethmalani, Jersey City, NJ (US); Michael Jim Tien Chan, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 407 days.

(21) Appl. No.: 17/741,223

(22) Filed: May 10, 2022

(65) Prior Publication Data

US 2023/0370275 A1    Nov. 16, 2023

(51) Int. Cl.
*H04L 9/32*       (2006.01)
*H04L 9/00*       (2022.01)
*H04L 9/08*       (2006.01)
*H04L 9/40*       (2022.01)

(52) U.S. Cl.
CPC .......... *H04L 9/3239* (2013.01); *H04L 9/0822* (2013.01); *H04L 9/50* (2022.05); *H04L 63/0428* (2013.01)

(58) Field of Classification Search
None
See application file for complete search history.

(56) References Cited

U.S. PATENT DOCUMENTS

| | | | |
|---|---|---|---|
| 10,650,376 B1 | 5/2020 | Winklevoss et al. | |
| 11,075,891 B1 | 7/2021 | Long et al. | |
| 11,356,263 B2 * | 6/2022 | Fletcher | H04L 9/0637 |
| 2015/0264050 A1 | 9/2015 | Neuman et al. | |
| 2015/0363876 A1 | 12/2015 | Ronca et al. | |
| 2017/0103385 A1 | 4/2017 | Wilson, Jr. et al. | |

(Continued)

FOREIGN PATENT DOCUMENTS

WO    2017139112 A1    8/2017

OTHER PUBLICATIONS

Adi Shamir; How to share a secret; 1979; retrieved from the Internet https://dl.acm.org/doi/abs/10.1145/359168.359176; pp. 1-2, as printed. (Year: 1979).*

(Continued)

*Primary Examiner* — Michael W Chao
(74) *Attorney, Agent, or Firm* — Haynes and Boone, LLP

(57) ABSTRACT

Methods and systems described herein may implement blockchain asset authentication. A verification system may generate an encryption key associated with a digital asset, wherein the digital asset is associated with a first entity. The verification system may sign the digital asset using the encryption key. The verification system may generate a first key and a second key based on the encryption key, wherein the first key and the second key are part of a set of multi-party secret keys. The verification system may send the first key to the first entity and store the second key on the verification system. The verification system may receive a request to authenticate the digital asset. The verification system may in response to the request to authenticate, generate the encryption key based on the first key and the second key. The verification system may authenticate the digital asset based on the recreated first secret.

20 Claims, 15 Drawing Sheets

(56) References Cited

U.S. PATENT DOCUMENTS

| | | | |
|---|---|---|---|
| 2017/0317833 A1 | 11/2017 | Smith et al. | |
| 2019/0318107 A1* | 10/2019 | Capone | G06F 21/6218 |
| 2019/0366475 A1* | 12/2019 | Scarselli | H04L 9/3247 |
| 2020/0294011 A1* | 9/2020 | Robertson | H04L 9/0637 |
| 2021/0049600 A1* | 2/2021 | Spector | H04L 9/085 |
| 2021/0233204 A1* | 7/2021 | Alattar | G06T 1/005 |
| 2022/0067738 A1* | 3/2022 | Fang | G06Q 20/389 |
| 2022/0078023 A1* | 3/2022 | Nicolas | G06F 21/602 |
| 2022/0222364 A1* | 7/2022 | Roberts | G06F 21/64 |
| 2022/0300950 A1* | 9/2022 | Yakovlev | G06F 21/31 |
| 2022/0309491 A1* | 9/2022 | Shapiro | G06F 21/64 |
| 2022/0374886 A1* | 11/2022 | Micali | G06F 21/64 |
| 2022/0391887 A1* | 12/2022 | Jakobsson | H04L 9/3239 |
| 2023/0139878 A1* | 5/2023 | Clark | H04L 9/3297 713/157 |
| 2023/0254136 A1* | 8/2023 | Stewart | H04L 9/50 713/150 |
| 2023/0275751 A1* | 8/2023 | Sneider | H04L 9/3242 713/176 |
| 2023/0385815 A1* | 11/2023 | Jakobsson | G06Q 20/36 |

OTHER PUBLICATIONS

Wikipedia; Shamir's secret sharing; 2022; retrieved from the Internet https://web.archive.org/web/20220224013402/https://en.wikipedia.org/wiki/Shamir's_secret_sharing; pp. 1-7, as printed. (Year: 2022).*

Horander et al., "Horcruxes for Everyone—A firework for key-loss recovery by splitting trust"; 2019; retrieved from the Internet https://ieeexplore.ieee.org/abstract/document/8887323; pp. 1-8, as printed. (Year: 2019).*

International Search Report and Written Opinion mailed Jul. 11, 2023 in International Application No. PCT/US2023/018994, 10 pages.

* cited by examiner

VERIFICATION SYSTEM FOR PROVING AUTHENTICITY AND OWNERSHIP OF DIGITAL ASSETS

TECHNICAL FIELD

The disclosure relates generally to digital assets, and more specifically to authenticating authenticity and ownership of a digital asset.

BACKGROUND

Entities may utilize online electronic transaction processors to process transactions between entities as well as exchange and transfer funds. This may include transactions on digital marketplaces and the like. Digital marketplaces may include e-commerce platforms, virtual marketplaces in games, marketplaces in a virtual environment such as a metaverse, etc. Entities may transact in these digital marketplaces using various assets, such as money in a traditional bank account, digital assets including cryptocurrency, non-fungible tokens (NFTs), and other digital assets. Some digital assets may be built on a cryptographic platform, such as a distributed ledger (e.g., Blockchain, Ethereum) that allows purchase, sale, and transfer of the digital assets. Entities or digital marketplace participants may store digital assets in digital wallets.

Entities may engage in transactions, such as an offer for sale, purchase, and/or transfer of digital assets in the digital marketplace. The digital marketplaces conduct transactions using public ledgers, which are often permission-less and do not establish trust between the entities engaging in the transaction. For example, digital assets, such as NFTs, may be offered for sale on a distributed ledger via a digital marketplace. However, the distributed ledger may be accessed and written to by any entity to indicate the NFT is on sale, even if that entity is not an owner of the NFT.

Unlike, networks where third party verification systems perform authentication of the e-commerce platforms and allow a safe exchange of goods and/or services in exchange for payment, the distributed ledgers do not require third party authentication systems. Further, there is a lack of information, such as the provenance of the digital asset or the person offering the asset for sale, because these transactions are listed for sale by an entity who may merely be identified by an address on the distributed ledger. As a result, risks exist for fraudulent transactions involving digital assets conducted through conventional distributed ledger systems.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
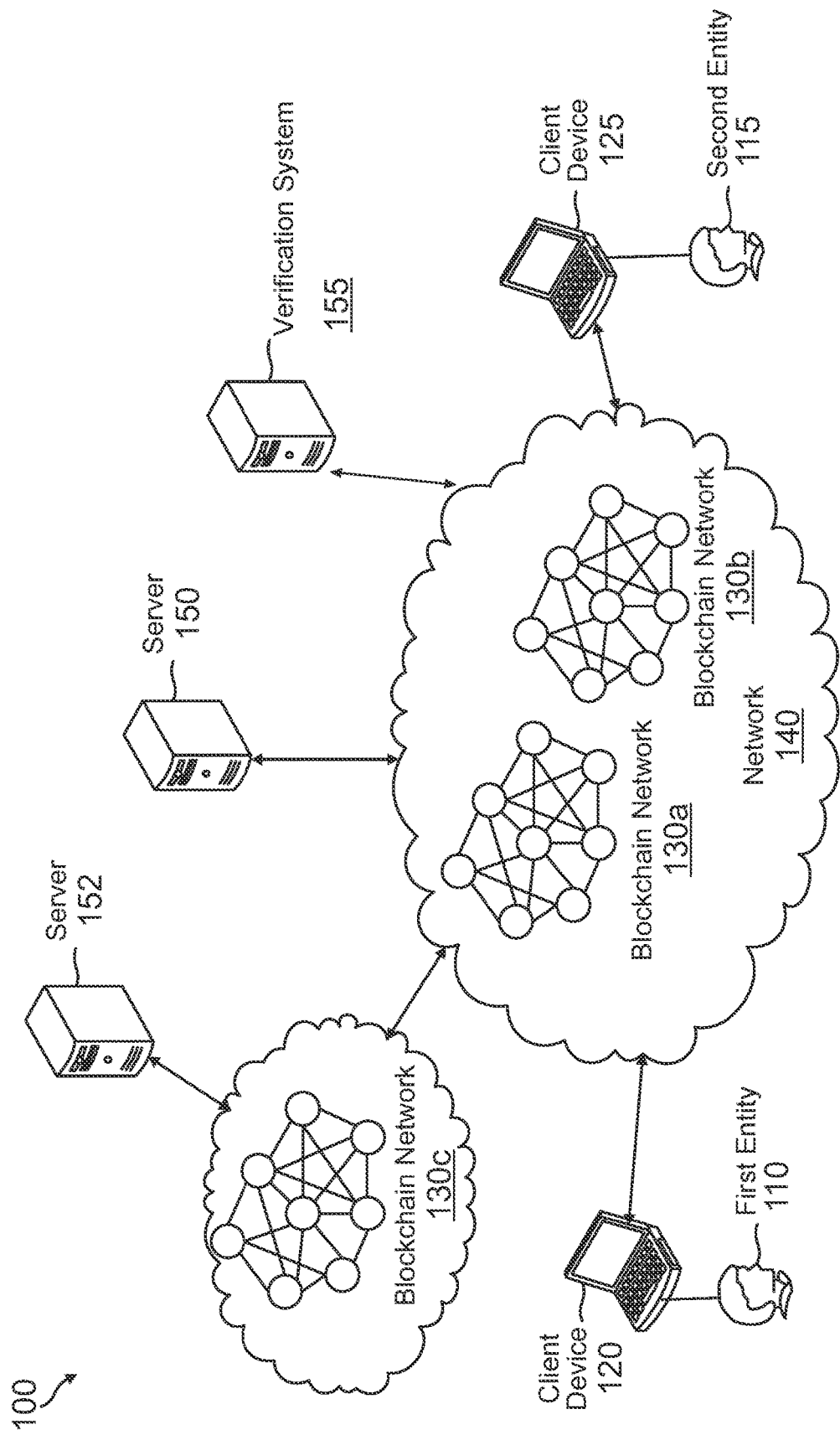
FIG. 1 illustrates an exemplary computing environment for facilitating transactions on an example blockchain network, according to an embodiment.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made, without departing from the scope described herein. Various aspects are capable of other embodiments and of being practiced or being carried out in various different ways.

A distributed ledger, such as a blockchain, refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others, the distributed ledger represents each transaction where units of cryptocurrency are transferred between entities. Using a digital currency exchange, an entity may buy any value of digital currency or exchange any holdings in digital currencies into worldwide currency or other digital currencies. Each transaction can be verified by the distributed ledger and only verified transactions are added to the distributed ledger. The distributed ledger, along with many aspects of a blockchain, may be decentralized. Because of this, the accuracy and integrity of the ledger cannot be attacked at a single, central location. Modifying the distributed ledger at all, or at a majority of locations where it is stored, is difficult so as to protect the integrity of the distributed ledger. This is because individuals associated with the nodes of a peer-to-peer network that stores the distributed ledger have a vested interest in the accuracy of the ledger.

Though maintaining cryptocurrency transactions in the distributed ledger may be the most recognizable use of blockchain technology today, the distributed ledger may be used in a variety of different fields. Indeed, blockchain technology is applicable to any application where data of any type may be accessed.

In some embodiments described herein, a verification system may facilitate transactions of a digital asset, such as an NFT, on a distributed ledger by authenticating the digital asset. Authenticating the digital asset may include establishing and authenticating an author of the digital asset, an owner of the digital asset and the like. For example, the verification system may generate and maintain key shares (e.g., a first key and a second key) for the entities associated with the digital asset to allow access to an encryption signature used to authenticate the digital asset on the distributed ledger.

The verification system may generate an encryption key, or another secret or secret key, associated with the digital asset and generate the signature on the distributed system based on the encryption key. The verification system may generate the encryption key associated with the digital asset, sign the digital asset using the encryption key, divide the encryption key into one or more keys shares (e.g., a first key and a second key), and distribute a key share (e.g., a first key) to an entity and retain a key share (e.g., a second key) on the verification system. In response to a request to authenticate the digital asset, the verification system may regenerate the encryption key based on the first key of a first entity and the second key of the verification system.

With the regenerated key, the verification system may cryptographically authenticate a digital asset to facilitate transactions of the digital asset on the distributed ledger. In an example, the verification system cannot regenerate the encryption key until a threshold number of key shares is available. For example, in a proactive secret share, such as a Samir secret share, the encryption key is divided among one or more entities into multiple keys such that a threshold number of keys can decode the secret, while keys below the threshold number of keys cannot decode the secret.

In some embodiments, the verification system may generate an attestation associated with the first digital asset. The attestation may link the first digital asset to be associated with the first entity (e.g., an author of the first digital asset). In some embodiments, the first digital asset is encrypted using an encryption key associated with the first digital asset and therefore the digital signature associated with the first digital asset may not be linked to the first entity. The verification system may generate an attestation to link the first digital asset to the address of the first entity on the distributed ledger.

In some embodiments, the verification system may generate a rights profile, also called a birth certificate, associated with the first digital asset. The rights profile may prove the provenance of the first digital asset such as the author of the first digital asset, the owner of the first digital asset, the verification system associated with the first digital asset, etc. The rights profile may also provide the rights associated with different entities, such as the author, the owner, etc., including the right to make derivative works, the right to broadcast and the like. In an example, the verification system may include the rights profile as a token, such as a smart contract, during the sale of the first digital asset. The verification system may store the rights profile on the verification system, to allow access to the information upon a request.

The verification system may ensure privacy of a first digital asset transaction by generating and encrypting a first one-time address to generate a secret, i.e., the first one-time address. The verification system may encrypt the first one-time address based on the first secret. The encryption key may be derived based on a public-public key pair associated with a first entity and a second public-private key pair associated with a second entity. The verification system may generate a first secret key and a second secret key that are part of a set of multi-party keys based on the encryption key.

In some embodiments, the verification system may generate an attestation associated with the digital asset. The attestation may link the digital asset to an address on a distributed ledger associated with the first entity.

In some embodiments, the verification system may generate an encryption key based on the digital asset that secures the rights profile of the digital asset. Based on the encryption key, the verification system may generate a first key associated with a first entity and a second key associated with the verification system.

Implementations of the disclosure will now be described in detail with reference to the accompanying Figures. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network, where the distributed ledger maintains a number of blockchain transactions. FIG. 1 illustrates an exemplary computing environment 100 for facilitating transactions on an example blockchain network, according to an embodiment. The computing environment 100 includes a client device 120 associated with first entity 110, a client device 125 associated with second entity 115, a first server 150, a second server 152, and a verification system 155 interconnected via a network 140. The client device 120, the client device 125, the first server 150, and/or the second server 152 may operate using components of an example computing system 1300 described in more detail in FIG. 13. Further, client devices 120 or 125 may include a personal computer, a laptop computer, a smartphone, a personal data assistant (PDA), etc. The verification system 155 may be configured to connect and exchange data between client device 120, client device 125 and blockchain networks 130*a-b* via the network 140. The network 140 may be any of a variety of available networks, such as the Internet, and represents a worldwide collection of networks and gateways to support communications between devices connected to the network 140.

Computing environment 100 may also comprise one or more distributed or peer-to-peer (P2P) networks, such as a first, second, and third blockchain networks 130*a-c* (generally referred to as blockchain networks 130). As shown in FIG. 1, the network 140 may comprise the first and second blockchain networks 130*a* and 130*b*. The third blockchain network 130*c* may be associated with a private blockchain as described below with reference to FIG. 2 and is connected to one or more servers, such as the first server 150, and is thus, shown separately from the first and second blockchain networks 130a and 103b. Each blockchain network 130 may comprise a plurality of interconnected devices (or nodes) as described in more detail with reference to FIG. 2. As discussed above, a blockchain, which may also be referred to as a ledger, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as first entity 110 of the client device 120 and the second entity 115 of the client device 125 in FIG. 1 or uploading data to blockchain network 130 by client devices 120, 125 of one of entities 110, 115. In a non-limiting embodiment, the first entity 110 and the second entity 115 may be users, merchants, subscribers, institutions, other devices, etc., capable of operating the client device 120 and the client device 125. Each of the servers 150 and 152 may include one or more applications, for example, a transaction application configured to facilitate the transaction between the entities by utilizing a blockchain associated with one of the blockchain networks 130. As an example, the first entity 110 may request or initiate a transaction with the second entity 115 via an application executing on the client device 120. The transaction may be related to a transfer of value or data from the first entity 110 to the second entity 115. The client device 120 may send a request of the transaction to the first server 150. The first server 150 and/or the second server 152 may send the requested transaction to one of the blockchain networks 130 to be validated and approved as discussed below. In another example, first entity 110 may upload a transaction that is associated with a record of data to blockchain network 130 via first server 150 and/or second server 152.

In some embodiments, verification system 155 may facilitate transactions of digital assets on a distributed ledger by providing a multi-party key authentication mechanism that allows the digital assets to be authenticated. An example digital asset may be an NFT, while an example digital ledger may be one of blockchain networks 130a-c. Verification system 155 may facilitate the first entity 110 to create an authentication mechanism for a digital asset. The authentication mechanism may authenticate authorship and/or ownership of the digital asset. As will be discussed in detail below, verification system 155 may generate an encryption key or another secret associated with the digital asset, sign the digital asset using the encryption key, divide the encryption key into one or more keys shares (e.g., a first key and a second key) that are part of a multi-party secret key share and distribute one key share (e.g., the first key) to the first entity 110 and retain another key share (e.g., the second key) on the verification system 155. In response to a request from the second entity 115 to authenticate the digital asset, the verification system 155 may regenerate the encryption key based on the keys shares (e.g., the first key and the second key) distributed to the first entity 110 and retained by the verification system 155. Although the example above describes two key shares, verification system 155 may divide the encryption key into more than two key shares.

Blockchain Network

Figure 2:
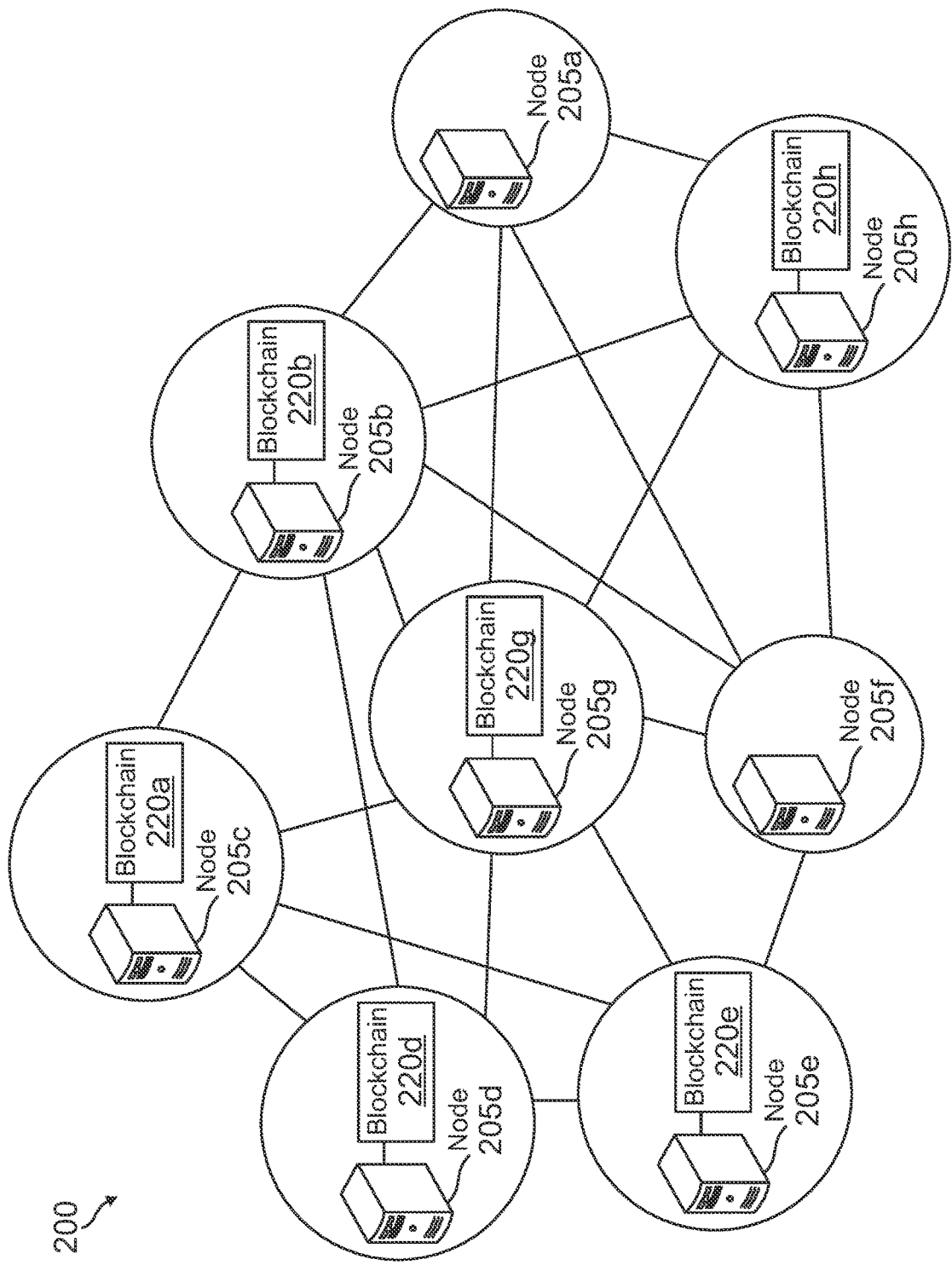
FIG. 2 illustrates an environment of an exemplary distributed ledger network, according to an embodiment.

FIG. 2 is a diagram of an example blockchain network 200 comprising a plurality of interconnected nodes or devices 205a-h (generally referred to as nodes 205). Blockchain networks 130a-c discussed in FIG. 1 may be implemented as blockchain network 200. Each of the nodes 205 may comprise a computing system 1300 described in more detail with reference to FIG. 13. Although FIG. 2 shows a single device for each node 205, each of the nodes 205 may comprise a plurality of devices (e.g., a pool). The blockchain network 200 may be associated with one or more blockchains 220a-h (generally referred to as blockchain 220). Some or all of the nodes 205 may replicate and save an identical copy of the blockchain 220. For example, FIG. 2 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, Internet-of-Things (IoT) devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

Figure 3:
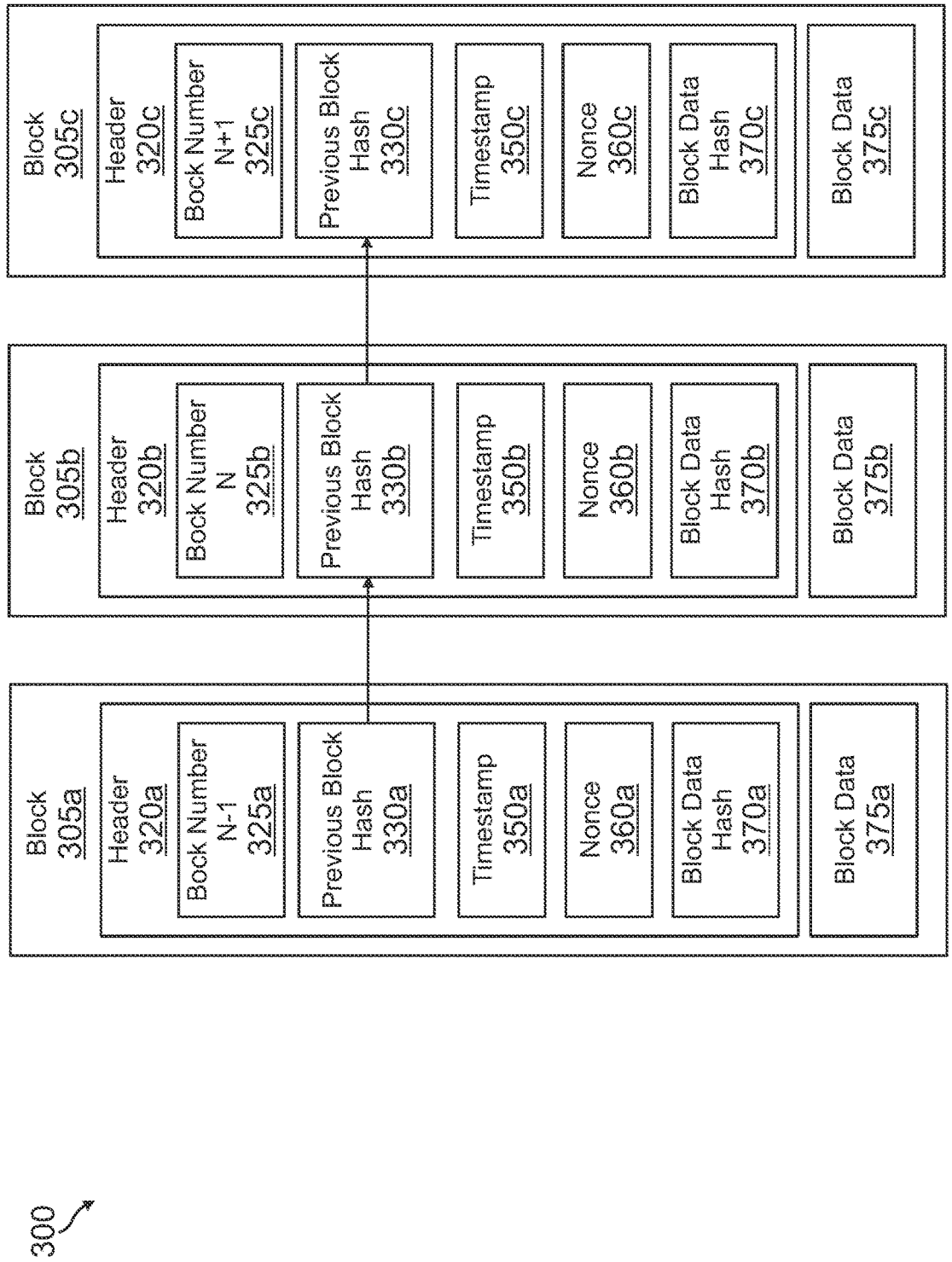
FIG. 3 illustrates a block diagram of an exemplary distributed ledger, according to an embodiment.

FIG. 3 is a block diagram illustrating an example blockchain 300. Blockchain 300 may be blockchain 220 discussed in FIG. 2. Blockchain 300 may comprise a plurality of blocks 305a, 305b, and 305c (generally referred to as blocks 305). Blockchain 300 comprises a first block (not shown), sometimes referred to as the genesis block. Each of blocks 305 may comprise a record of one or a plurality of submitted and validated transactions. Blocks 305 of blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h discussed in FIG. 2, as a file or in a database.

Blocks

Each of blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain network 200 via a consensus model (described below). As discussed above, the block data 375 may include a variety of different types of data in addition to validated transactions. Block data 375 may include any data, such as text, audio, video, image, or file, that may be represented digitally and stored electronically. In some instances, blocks 305 may include a digital asset or NFT discussed above.

Blockchain Transaction

In one example, a blockchain based transaction may generally involve a transfer of data or value or an interaction between entities and described in more detail below. Referring to FIG. 1, the first server 150 and/or the second server 152 may include one or more applications. An example application may be a transaction application configured to facilitate a blockchain transaction between entities. The entities may include entities 110, 115, devices, etc. In an example, first entity 110 may request or initiate a transaction with second entity 115 via an entity application executing on the client device 120. The transaction may be related to a transfer of value or data from the first entity 110 to the second entity 115. The value or data may represent money, a contract, a property, records, rights, status, supply, demand, an alarm, trigger, a digital asset, an NFT, or any other asset that may be represented in digital form. The transaction may represent an interaction between entities, such as the first entity 110 and the second entity 115.

Figure 4:
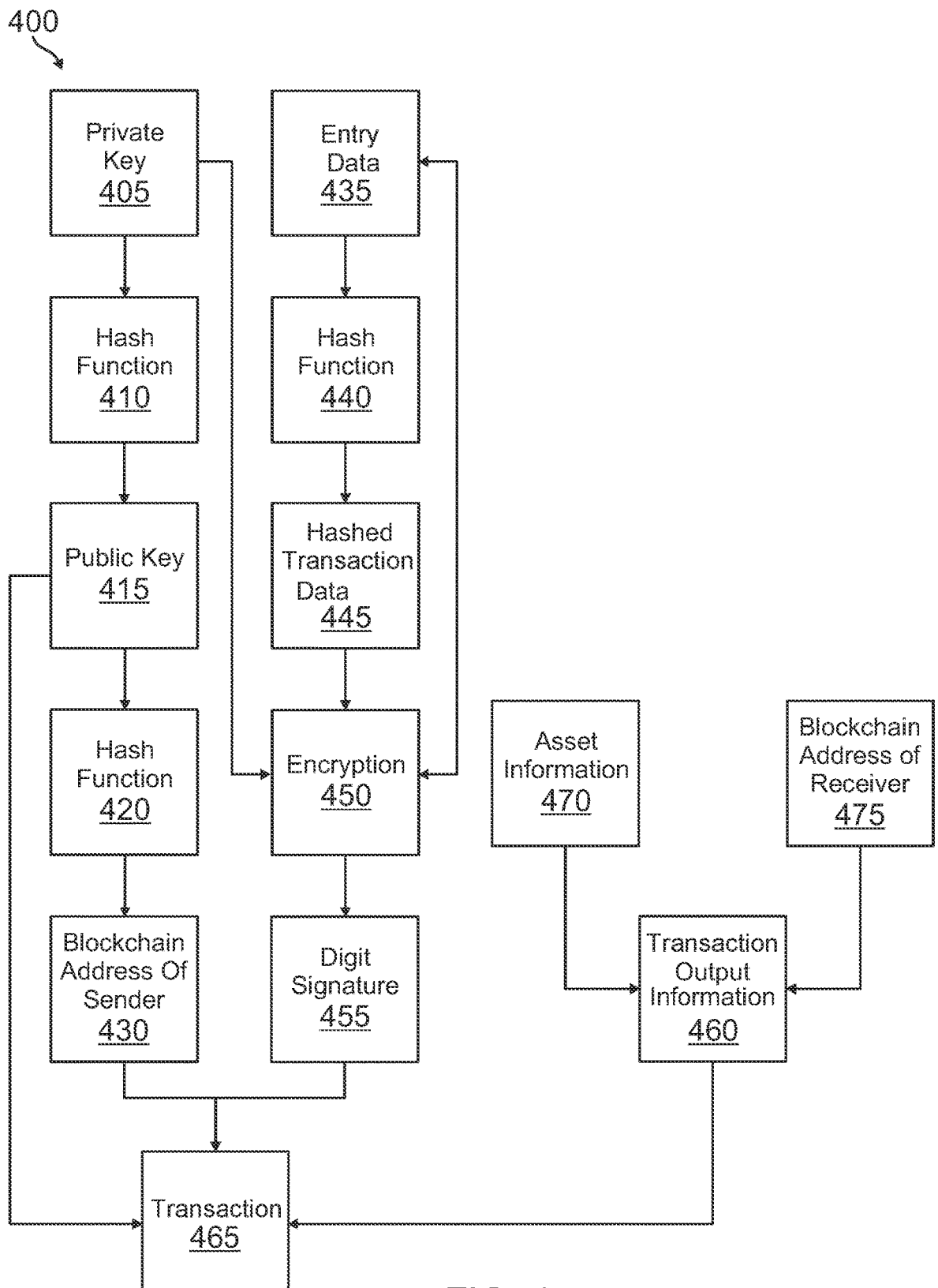
FIG. 4 illustrates a block diagram of an exemplary transaction message, according to an embodiment.

FIG. 4 is a block diagram 400 of a transaction generated by a transaction application, according to an embodiment. A transaction may be a transaction 465 that is performed between the first entity 110 and the second entity 115 of FIG. 1. In this example, transaction 465 may include a public key 415, a blockchain address 430 associated with first entity 110, a digital signature 455, and transaction output information 460. The transaction application may derive a public key 415 from a private key 405 of the first entity 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first entity 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first entity 110 is the originator of the transaction 465, the transaction application may generate the digital signature 455 for a transaction data 435 using the private key 405 of the first entity 110. The transaction data 435 may include information about the assets to be transferred and a reference to the sources of the assets, such as previous transactions in which the assets were transferred to the first entity 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first entity 110 resulting in the digital signature 455. The transaction output information 460 may include asset information 470 and an address or identifier for the second entity 115, such as the blockchain address 475. The transaction 465 may be sent from client device 120 of the first entity 110 to the first server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first entity 110, shown in FIG. 4 as the blockchain address of sender 430, may include an alphanumeric string of characters derived from the public key 415 of the first entity 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
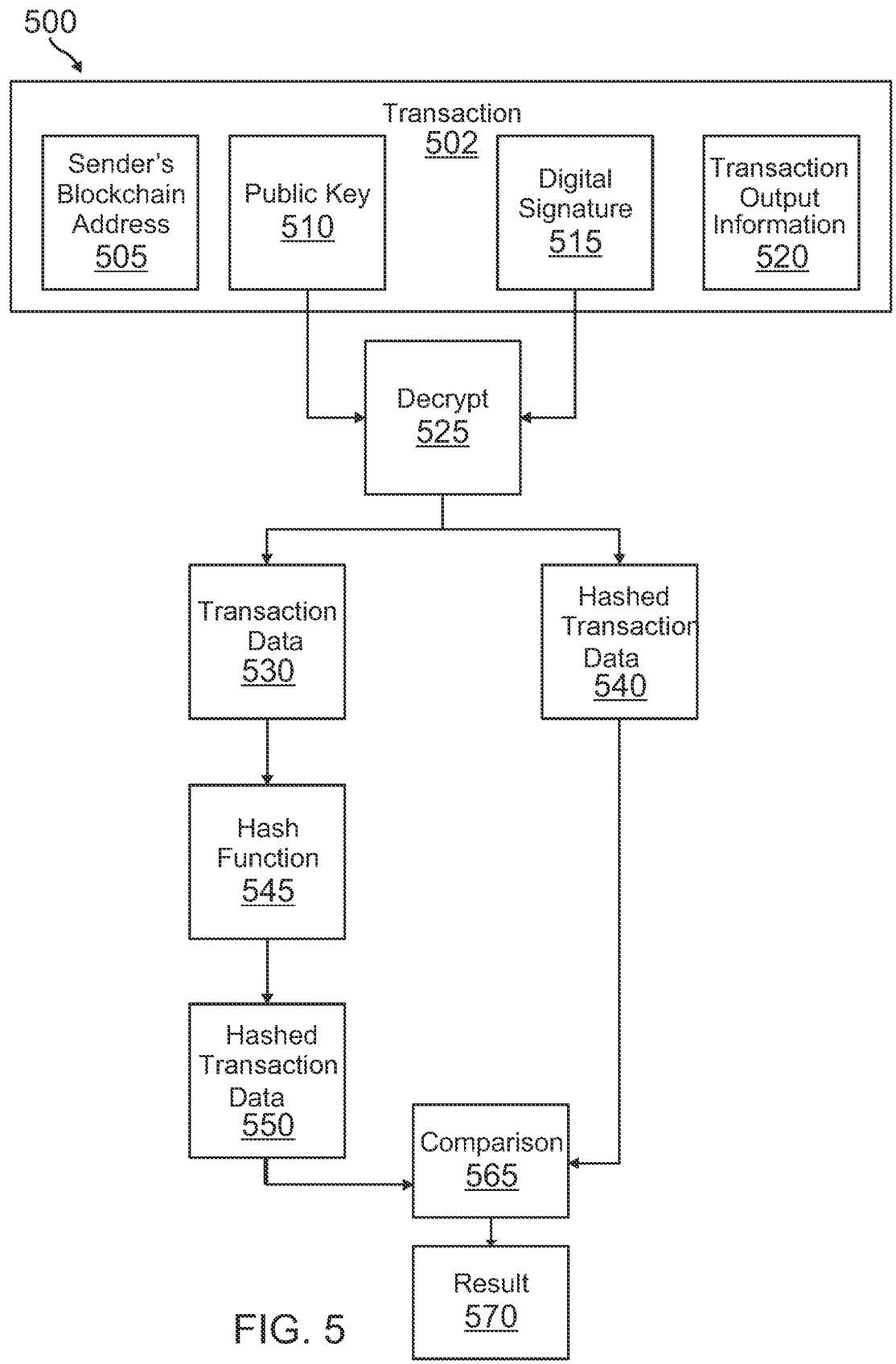
FIG. 5 illustrates a block diagram of an exemplary transaction broadcast on the distributed ledger network, according to an embodiment.

The first server 150 of FIG. 1 may receive transactions from entities of the blockchain network 130. The transactions may be submitted to the first server 150 via desktop applications, smartphone applications, digital wallet applications, web services, or other software applications that may execute on e.g., client device 120 or 125. The first server 150 may send or broadcast the transactions to the blockchain network 130. FIG. 5 is a diagram 500 showing an example transaction broadcasted by the first server 150 to the blockchain network 130, according to some embodiments. A transaction 502 may be broadcast to multiple nodes 205 of the blockchain network 130. Typically, once the transaction 502 is broadcasted or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcasted to one or more specific nodes based on criteria related to the node's geography, history, reputation, market conditions, docket/delay, technology platform. The rules may be dynamically modified or updated (e.g., turned on or off) to address issues such as latency, scalability, and security conditions. A transaction may be broadcast to a subset of nodes as a form of compensation to entities associated with those nodes (e.g., through receipt of compensation for adding a block of one or more transactions to a blockchain).

Transaction Validation—Entity Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing entity authenticity and transaction data integrity. Entity authenticity may be established by determining whether the sender indicated by the transaction 502 is in fact the actual originator of the transaction 502. Entity authenticity may be proven via cryptography, for example, asymmetric-key cryptography using a pair of keys, such as a public key and a private key. Additional factors may be considered when establishing entity authenticity, such as entity reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first entity 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the entity to conduct transactions and manage the balance. The digital wallet may be stored or maintained online or offline, and in software or hardware or both hardware and software in e.g., client devices 120 or 125 discussed in FIG. 1. Without the public/private keys, an entity has no way to prove ownership of assets. Additionally, anyone with access an entity's public/private keys may access the entity's assets. While the assets may be recorded on the blockchain, the entity may not be able to access them without the private key.

Tokens

A token may refer to an entry in the blockchain that belongs to a blockchain address. The entry may comprise information indicating ownership of an asset. The token may represent money, a contract, a property, records, access rights, status, supply, demand, an alarm, a trigger, a reputation, a ticket, a digital asset, an NFT, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. An entity, e.g., first entity 110 or second entity 115 that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to an entity via a blockchain transaction. For example, the owner may sign the transaction corresponding to the transfer of the token with the private key. When the token is received by the entity, the token may be recorded in the blockchain at the blockchain address of the entity.

Establishing Entity Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block data 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally intensive operation is needed at the node to determine an appropriate nonce value through a "brute force" trial-and-error method. Once a successful nonce value is determined, the completed block is published to the blockchain network for validation. If validated by a majority of the nodes in the blockchain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue, it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcasted to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, blockchain network 130 may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive than the proof of work model. Unlike the proof of work model which is open to any node having the computational resources for solving the mathematical problem, the proof of stake model is open to any node that has a stake in the system. The stake may be an amount of cryptocurrency that the blockchain network node (entity) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g., in the context of a corporate environment), a hybrid blockchain network may switch to be between completely or partially permissioned and permissionless. The network may switch based on various factors, such as latency, security, market conditions, etc.

Smart Contracts

A smart contract is a set of instructions executable on a peer node (that may include terms for execution) that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, first entity 110 may create a smart contract to sell a digital asset (e.g., NFT) to the second entity 115. A smart contract, which may be a peer executable set of instructions, and may be utilized between the first entity 110 and the second entity 115 for sale of the digital asset. The smart contract may include information about the bundle of rights associated with the NFT, the transaction price associated with the digital asset, and the like. For example, the smart contract associated with the digital asset may include instructions on how to complete the purchase transaction, the rights of the purchaser to create derivative works, to sell derivative works, the royalty share to the first entity 110 for each derivative work, the consequences of creating a derivative work such as cancellation of the transaction when derivative works are not authorized, and the like.

Figure 6:
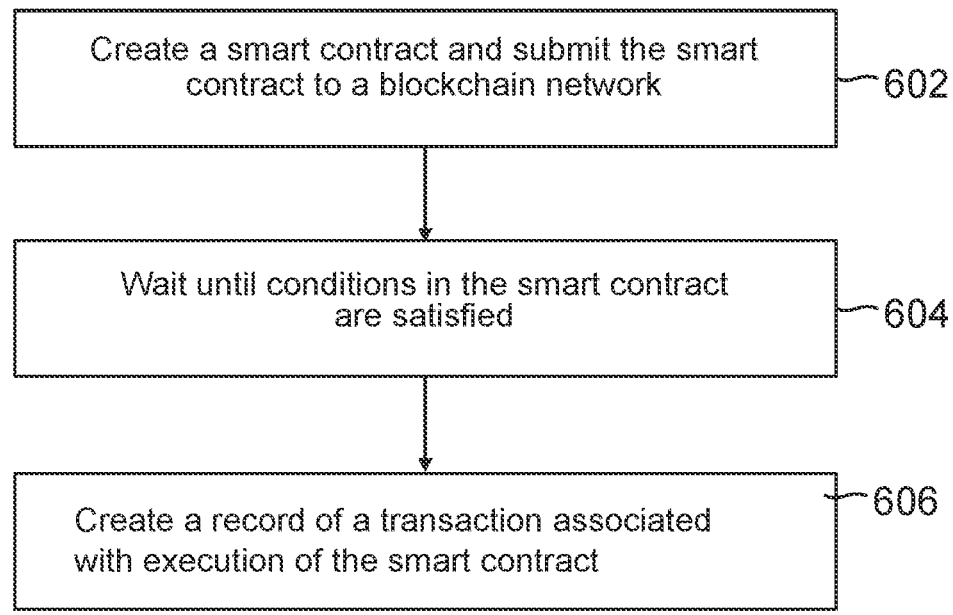
FIG. 6 illustrates a diagram of a method for performing a smart contract transaction, according to an embodiment.

FIG. 6 is a flow diagram showing steps of an example method 600 for performing a smart contract transaction between entities, such as the first entity 110 and the second entity 115, or a transaction that creates the digital asset. The steps of the method 600 may be performed by any of the computing devices shown in FIG. 1. Alternatively, or additionally, some or all of the steps of the method 600 may be performed by one or more other computing devices. Steps of the method 600 may be modified, omitted, and/or performed in other orders, and/or other steps added.

At step 602, a smart contract is created and uploaded to blockchain. For example, smart contract between the first entity 110 and the second entity 115 may be created and then submitted to the blockchain network 130a as a transaction. In another example, first entity 110 may create a digital asset and generate a record of the digital asset on blockchain network 130a. The transaction may be added to a block that is mined by the nodes 205 of the blockchain network 130a, the block comprising the transaction may be validated by the blockchain network 130a and then recorded in the blockchain 220. The smart contract associated with the transaction may be given a unique address for identification.

At step 604, wait until conditions in the smart contract are satisfied. An example condition may be whether a notification regarding whether money was sent from a blockchain address associated with client device 125 of second entity 115 and was received at a blockchain address associated with the second entity 115 in accordance with the set of instructions in the smart contract associated with the digital asset. Another example may be a notification that the digital asset was uploaded to a cloud server at an address recognized by blockchain network 130*a*.

At step 606, a record of a transaction associated with execution of the smart contract is created. For example, the transaction may include information of the payment received, the date the payment was received, an identification of the first entity 110 and an identification of the second entity 115. The transaction may be broadcast to the blockchain network 130*a* and recorded in the blockchain 220. If the transaction is successfully recorded in the blockchain 220, the transaction may be executed. For example, if the payment was received on then an electronic receipt may be generated and sent to the first entity 110.

Blockchain-Based Application: NFT

An NFT is a nonfungible token that may be created and stored electronically in a blockchain, such as a the blockchain network 130*a* in FIG. 1. As discussed above, a smart contract is a set of instructions that are executable by a peer while mining a new block. The smart contracts are stored as tokens on the blockchain network 130*a* in FIG. 1. However, tokens may be created with data, which makes the tokens unique and distinguishable from the rest of the tokens that contain instructions. This makes these tokens unique, and they cannot be exchanged with another arbitrary type of token, or a non-fungible token. In an example, the NFT may include both a set of instructions and data. The NFT data may include a hash of the digital asset and a link to a digital object such as a document, an image, a video, an audio file, or the like. The NFT link may store the file on a storage offered by a cloud service provider or on a file system such as inter-planetary file system.

Blockchain Enabled Multi Party Key Authentication

Going back to FIG. 1, in some embodiments, a transaction for a digital asset may occur between entities 110 and 115 via client device 120 of the first entity 110 and client device 125 of second entity 115. A digital asset may be an NFT discussed above. In one embodiment, first entity 110 may be an original creator or author of the digital asset, e.g., an entity that creates the digital asset. In another embodiment, first entity 110 may be an owner of the digital asset because first entity 110 received the digital asset as a transaction from a creator or another owner. First entity 110 may conduct a transaction using client device 120 that transfers or sells the digital asset to second entity 115. To ensure that the digital asset that is transferred or about to be transferred to second entity 115 is authentic and not a forgery, e.g., first entity 110 is a genuine author or owner of the digital asset, verification system 155 may sign the digital asset using a multi-party key authentication mechanism and then use the multi-party key authentication to authenticate the authorship or ownership of the digital asset.

In an example, the verification system 155 may authenticate the digital asset in response to a request from an entity. During mining, the digital asset is signed using an encryption key. The authentication may be based on a proof of access to the encryption key. The encryption key may be a private key of a public-private key pair, where the public key is made available to an entity through a key sharing mechanism, such as a GPG mechanism. The verification system 155 may protect the encryption key via a multi-party key authentication mechanism that divides the encryption key into multiple key shares and transmits the key shares to multiple entities that have rights to the digital asset. To authenticate the digital asset, the verification system 155 may regenerate the encryption key from at least a minimum number of entities that have key shares of the encryption key and consent to the encryption key being regenerated. The verification system 155 may sign a response message to the authentication request using the regenerated encryption key. If an entity can decrypt the signed response message using the same public key that decrypts the signature of the digital asset, the regenerated encryption key is the same key as the encryption key used to sign the digital asset during minting, thus proving the authenticity of the digital asset. The verification system 155 may use the multi-party key authentication to divide the encryption key among entities with rights in the digital asset such as the owner, the creator, and the verification system 155. Multi-party key authentication is further discussed with respect to FIGS. 7A-7B and 8A-8B below.

Figure 7A:
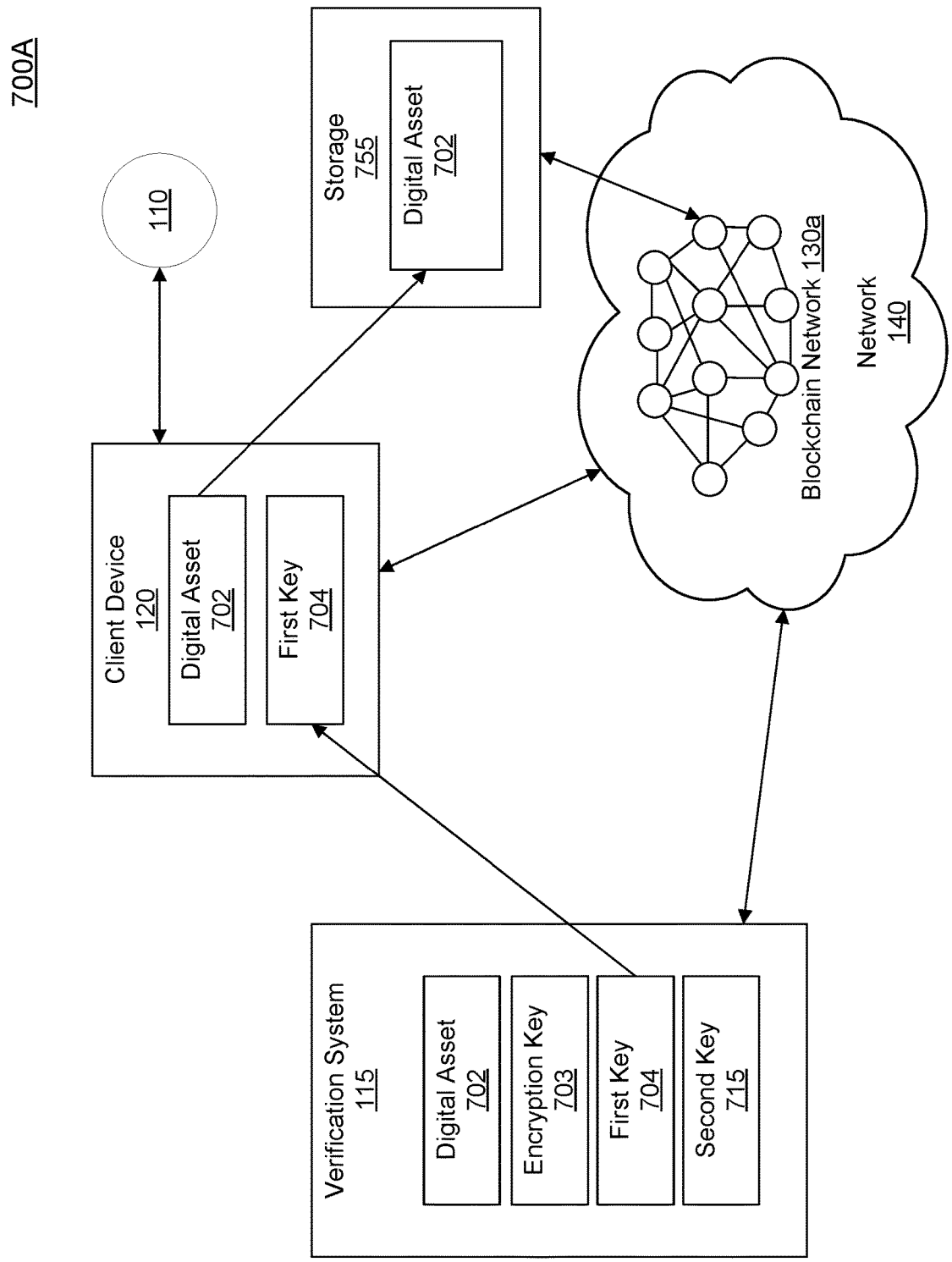
FIGS. 7A-B are block diagrams of an environment that authenticates a digital asset using multi-party key authentication, according to an embodiment.
Figure 7B:
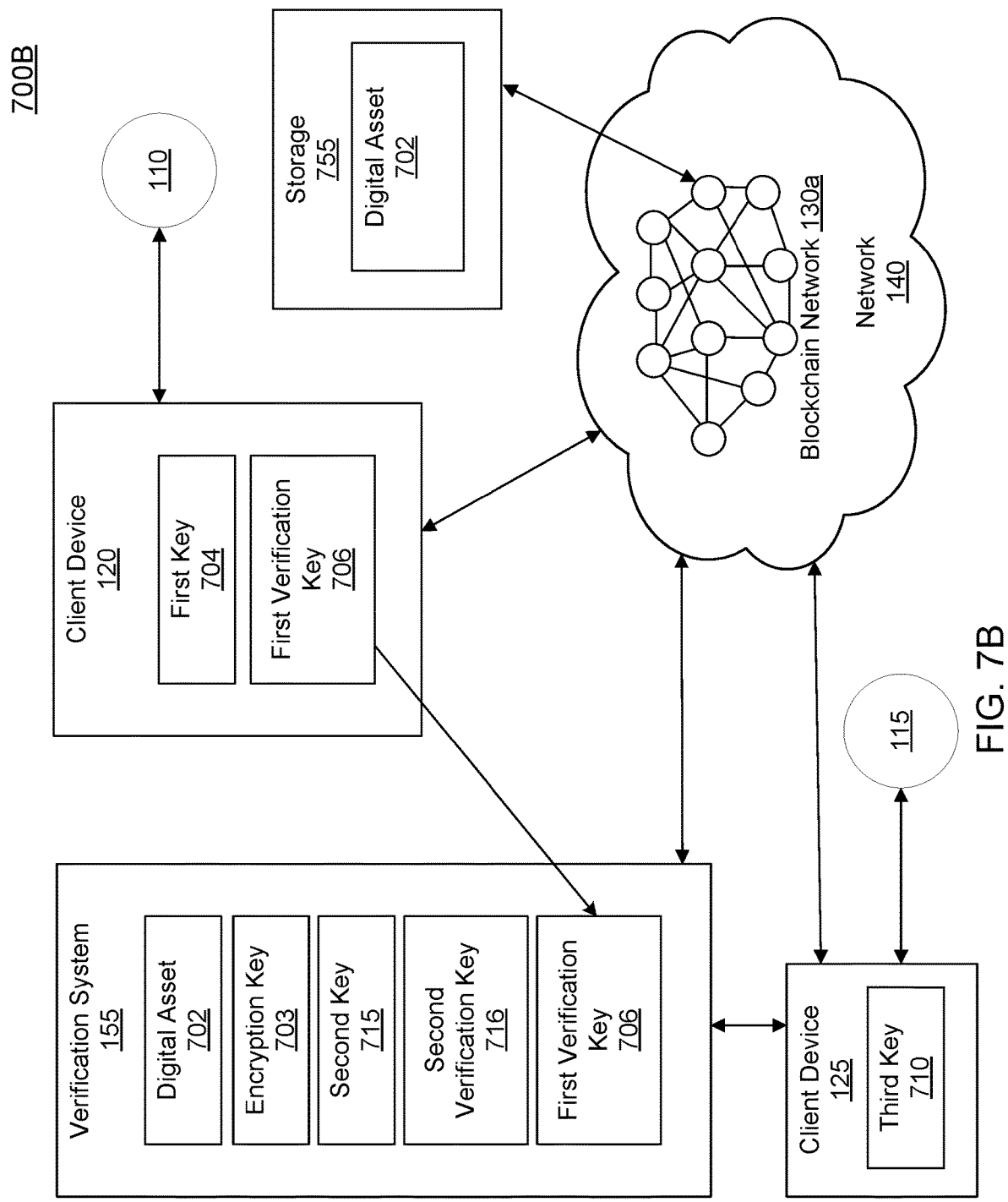

FIGS. 7A-7B are diagrams 700A-700B of an environment that authenticates a digital asset using multi-party key authentication, according to some embodiments. Verification system 155 shown in FIG. 7A may generate multiple keys in a multi-party key authentication mechanism for authenticating a digital asset, according to some embodiments. A digital asset 702 in FIGS. 7A-7B may be one of the digital assets discussed above, such as an NFT. Digital asset 702 may be originally created or minted by first entity 110. To mint the digital asset 702, the verification system 155 may generate a hash of a digital file such as a document, an image, an audio file, a video file, or the like. The digital file may be the original work for which the digital asset 702 is created. The verification system 155 may generate an encryption key 703 associated with a digital asset 702 and sign the hash of the digital file. The verification system 155 may generate a token associated with the digital asset 702 that includes a signed hash of the digital file, a link to a storage 755 that includes the digital file, and an address associated with the creator of the digital asset 702. The hash of digital asset 702 provides a unique identifier of the digital asset 702 for verifying the integrity of the digital asset 202. Storage 755 may store digital asset 702. Storage 755 may be a cloud-based storage or another type of memory storage. Storage 755 may be accessible via blockchain network 130*a*. Once created, entity 110 may use client device 120 to transfer digital asset 702 to storage 755 either directly or by using one of servers 150, 152 discussed in FIG. 1. The verification system 155 may send the token to a peer on the blockchain network 130*a* to be included in a block of the blockchain network 130*a*.

Verification system 155 may authenticate authorship and/or ownership of digital asset 702. For example, verification system 155 may generate a secret, such as encryption key 703 for digital asset 702. Encryption key 703 may sign the digital asset 702 in transactions on the distributed ledger (e.g., blockchain network 130*a*). The verification system 155 or client device 120 may store the digital asset 702 on the blockchain network 130*a* or in a storage 755 via a smart contract or linked to the smart contract as discussed above with reference to FIG. 6 and FIG. 10.

Verification system 155 may also generate a multi-party set of keys based on encryption key 703. For example, verification system 155 may generate a first key 704 and a second key 715 based on encryption key 703, wherein the first key 704 and the second key 715 are part of a multi-party set of keys. Keys in the multi-party set of keys may be associated with the same digital asset, such as digital asset 702. To generate the first key 704 and the second key 715 as part of multi-party set of keys, verification system 155 may use a polynomial based secret sharing mechanism, such as the Samir secret sharing. For example, verification system 155 may split the encryption key 703 into multiple parts, called "shares" where the first key 704 may be a first share and the second key 715 may be a second share. The two shares, e.g., the first key 704 and the second key 715, may be used to reconstruct the encryption key 703 during an authentication process.

In general, based depending on the number of transactions and context associated with digital asset 702, verification system 155 may generates i pieces of key shares $D_1, \ldots, D_d$ from the encryption key D (encryption key 703). For an example above that includes first key 704 and second key 715, i=2. Verification system 155 may divide the encryption key D into $D_i$ pieces by picking a polynomial of k−1 degrees, i.e., $q(x)=a_0+a_1x+\ldots a_{k-1}x^{k-1}$ in which $a_0=D$, and evaluate $D_1=q(1), \ldots, D_i=q(i), \ldots, D_n=q(n)$, where k is a threshold number of keys.

Verification system 155 may sign the token (e.g., a smart contract) associated with the digital asset 702 using the encryption key 703 that may be stored on for example the blockchain network 103*a*. After signing, verification system 155 may destroy the encryption key 703, in some embodiments. Verification system 155 may also distribute key shares to different entities and store one key share securely within verification system 155. For example, suppose first entity 110 is an author. In this example, verification system 155 may distribute first key 704 to client device 120 of the first entity 110 who is an author of the digital asset 702 and store the second key 715 securely within verification system 155. In a further example, the verification system 155 may add additional key shares when there are further transactions associated with the digital asset 702, such as a third key share (e.g., the third secret key) to a second entity 115 (e.g., the purchaser and owner of digital asset 702). More generally, verification system 155 may distribute one key share, such as the value of $D_i$ and the index i to each entity.

Verification system 155 shown in FIG. 7B may authenticate digital asset 702 using multiple keys in a multi-party key authentication mechanism, according to some embodiments. For example, digital asset 702 may be made available for purchase to another entity, such as second entity 115 associated with client device 125 via a digital token. Prior or during the transaction, second entity 115 may request verification system 155 to authenticate digital asset 702. For example, if first entity 110 claims to be an author of digital asset 702, verification system 155 may authenticate whether first entity 110 is indeed an author of digital asset 702. In another example, if first entity 110 claims to be an owner of digital asset 702, verification system 155 may authenticate whether first entity 110 is indeed an owner of digital asset 702.

Verification system 155 may verify the authenticity of the digital asset 702 by recreating the encryption key 703. For example, verification system 155 may use the first key 704 and the second key 715 to regenerate the encryption key 703. More generally, verification system 155 may regenerate the encryption key D (703) when a threshold number of key shares such as k or more of the $D_i$ key share pieces are available. The threshold number of key shares k may be less than i. When the threshold number of keys k is not met, the verification system 155 cannot generate the encryption key D (703). In an example, the key shares are based on finite field arithmetic to prevent a geometric attack based on knowledge of the order of polynomials used in a key share algorithm and insights to path of other points of the polynomial based on k−1 pieces. The verification system 155 may use any subset of k of the $D_i$ values and their identifying indices to determine the coefficients of q(x) by interpolation, and then evaluate D=q(0). Knowledge of just k−1 of these values, on the other hand is not sufficient to calculate encryption key D (703).

Verification system 155 may receive a request to authenticate the digital asset 702. In one instance, verification system 155 may receive the request from client device 125 of the second entity 115. In another instance, verification system 155 may receive the request from a marketplace selling the NFTs on the network 140 (not shown) rather than from client device 125. For example, a digital asset store of the marketplace (not shown) may include an Application Programming Interface (API) that accesses the verification system 155.

The verification system 155 may regenerate the encryption key 703 based on first key 704 and second key 715. Verification system 155 may request and receive first verification key 706 from client device 120 of the first entity 110. The wallet application, or another application on client device 120 may generate first verification key 706 from first key 704. For example, first key 704 may be a first part of the polynomial function and a first index of the polynomial function q(x). The first verification key 706 may be based on a value of the polynomial function q(x) at the first index location. Verification system 155 may also generate second verification key 716 from second key 715 that verification system 155 securely stores in its memory. Second key 715 may be a first part of the polynomial function and a second index of the polynomial function q(x). The verification system 155 may authenticate the digital asset 702 by recreating the encryption key 703 from first verification key 706 received from client device 120 and second verification key 716. If the encryption key 703 is recreated, then verification system 155 may return a message to client device 125 or the digital asset store that the author or the owner of digital asset 702 was authenticated. The verification system 155 may then generate a transaction on the blockchain, i.e., a smart contract to sell the digital asset 702 on the blockchain network 130*a* from first entity 110 to second entity 115 via client devices 120 and 125. Alternatively, if verification system 155 is unable to recreate encryption key 703, verification system 155 may return a message to client device 125 or the digital asset store that the author is not a genuine author or genuine owner of digital asset 702.

As discussed above, verification system 155 may store digital asset 702 on a storage 755 that may be part of or linked to blockchain network 130*a*. The location of digital asset 702 in storage 755 may be linked to the address of the smart contract created during the minting of the digital asset 702. The smart contract may be stored in a transaction on the blockchain network 130*a*. The verification system 155 may generate a digital signature for the transaction using the encryption key 703. When the verification system 155 sends information about the digital asset 702 and payment information associated with digital asset 702, a smart contract may be created between first entity 110 and second entity 115 and executed according to the process 700 shown in FIG. 7. In an embodiment, the verification system 155 may send information about the digital asset 702 and a smart contract may be generated with a hash of the digital asset 702 and a link to a storage 755 hosting a version of the digital asset 702.

In some embodiments, once second entity 115 of client device 125 purchases digital asset 702 via the smart contract, verification system 155 may generate a key share, such as third key 710 that may be stored on client device 125 for second entity 115. The process for generating a key share is discussed in FIG. 7A. Once the third key 710 is generated and stored on client device 125, the authentication mechanism discussed in FIG. 7B maybe used to authenticate an author of digital asset 702 based on first key 704 and an owner of digital asset 702 based on third key 710.

Verification system 155 may determine that a key share, such as first key 704 or third key 710 associated with one or more entities, such as entities 110 or 115 is compromised. The verification system 155 may revoke the compromised key shares and generate a replacement set of keys for the entities associated with the digital asset 702. In an example, the verification system 155 may derive the encryption based on the threshold number of k. For example, each entity may calculate a value of D. The verification system 155 based on any subset of k of the $D_i$ values (together with their identifying indices), may determine the coefficients of q(x) by interpolation, and then evaluate D=q(0), i.e., determine the encryption key 703. The verification system 155 may choose a polynomial of k−1 degrees $q(x)=a_0+a_1x+ \ldots a_{k-1}x^{k-1}$ in which $a_0$=D and is encryption key 703, and evaluate $D_1$=q (1), ..., $D_i$=q(i), ..., $D_n$=q(n) which are various key shares. The verification system 155 may distribute the new key shares $D_i$ along with the index i to client devices 120 and 125 (not shown). To regenerate the encryption key 703 the verification system 155 may determine the coefficients of q(x) based on at least k of the $D_i$ along with the index i and evaluate D=q(0).

In some instances, verification system 155 may also split the encryption key 703 into shared keys such that the keys of the verification system 155 are one key more than the threshold number of keys required to regenerate the encryption key 703 associated with the digital asset 702. In this case, if one of shared keys is compromised, the verification system 155 may use the second key 715 to generate the second verification key 716 and generate new shared keys for the entities based on the encryption key 703.

The verification system 155 may generate a third key 710 for the digital asset 702 associated with the second entity 115 as a result of a sale transaction of digital asset 792 from entity 110 to entity 115. Third key 710 may be generated as part of the set of multi-party secret keys. For example, the verification system 155 may generate a transaction the includes a first sale token associated with the digital asset 702 based on third key 710 for the digital asset 702, and the verification system 155 may communicate with a node of the blockchain network 130a to include the first sale token on the blockchain network 130a. Verification system 155 may then authenticate the owner of digital asset, entity 115, using third key 710.

In some embodiments, verification system 155 may determine a risk score associated with the digital asset 702. The risk score may be based on multiple factors. For example, the verification system 155 may determine a risk score associated with digital addresses, a number of digital addresses, etc., associated with a digital wallet of first entity 110. Verification system 155 may also determine a risk score based on a history of transactions associated with the first entity 110, transactions associated with digital asset 702 and other digital assets associated with first entity 110, and the like. Verification system 155 may also determine a risk score based on a combination of factors discussed above. The risk score may be provided to an entity, e.g., entity 115, as part of the authentication response authenticating digital asset 702.

Blockchain Enabled Asset Attestation

Figure 8A:
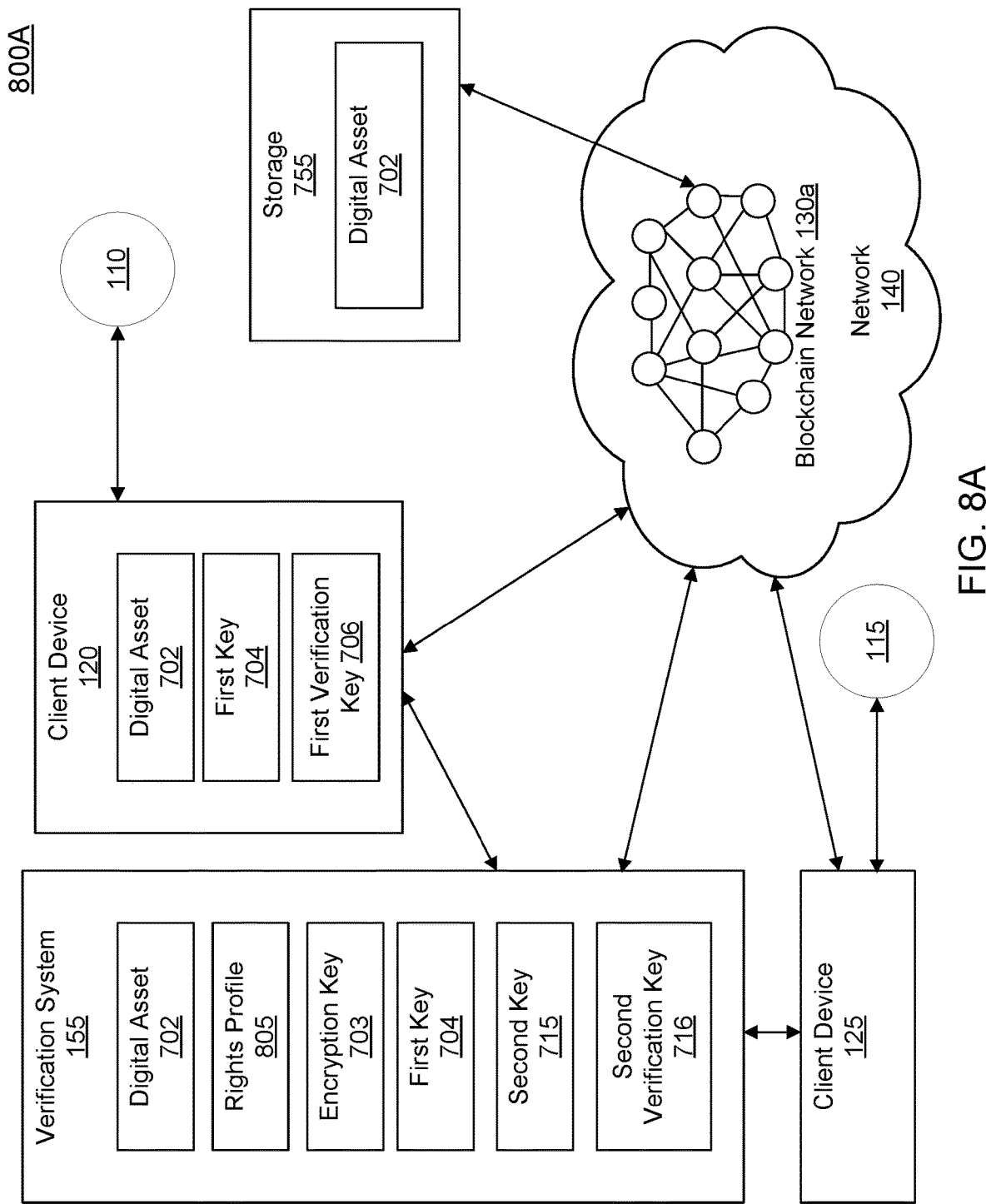
FIG. 8A is a block diagram of an environment that authenticates a rights profile of a digital asset using multi-party key authentication, according to an embodiment.

FIG. 8A illustrates a block diagram 800A of example environment for authenticating a rights profile, according to some embodiments. FIG. 8A includes verification system 155 in communication with client device 120 of the first entity 110 and client device 125 of entity 115 for example through a network (e.g., network 140), where first entity 110 may be an author of digital asset 702 and second entity 115 may be an owner of digital asset 702.

The verification system 155 may generate a rights profile 805 associated with a digital asset 702. Digital asset 702 may be stored on a distributed ledger (e.g., blockchain network 130a). The verification system 155 may generate an attestation that links an address on the distributed ledger to the digital asset 702. The attestation may associate the digital asset 702 to a rights profile 805. The rights profile 805 may include information such as the owner of the digital asset 702, the author of the digital asset 702, the bundle of rights associated with the digital asset 702 (e.g., transfer rights, sale rights, derivative rights, royalty rate, etc.). The verification system 155 may store the rights profile 805 on the distributed ledger (not shown) or on the verification system 155.

Verification system 155 may determine the rights profile 805 associated with the digital asset 702 based on contextual information. For example, verification system 155 may determine based on the contextual information that the first entity 110 is the creator and the owner of the digital asset 702. The verification system 155 may also determine based on the contextual information that first entity 110 has an obligation to assign ownership of the digital asset 702 to second entity 115, because first entity 110 may be an employee of second entity 115. In another example, verification system 155 may determine based on the contextual information that the first entity 110 is a support entity who interacts with the verification system 155 on behalf of a creator entity to generate the digital asset 702 and determine that the first entity 110 is neither the creator nor the owner of the digital asset 702. The verification system 155 may allow assignment of the appropriate rights based on the context.

The verification system 155 may generate an attestation that links the rights profile 805 with an address of the first entity 110. The attestation may be used to track royalty, use of the digital asset 702 and the like. For example, the rights profile 805 may be included in a smart contract that may be executed by a peer in a peer-to-peer-network mining the blockchain. The smart contract may include the rights profile 805, and the verification system 155 may generate a token that includes the rights profile to allow authentication and to verify authenticity of the digital asset 702. In an example, the attestation may be a link that reaches the verification system 155 for authentication of the digital asset 702. The attestation may be stored in a digital wallet of client device 120. When the digital asset 702 is offered for sale, verification system 155 may sign the attestation with the encryption key 703. The signature may authenticate the association between the digital addresses associated with first entity 110 and the digital address associated with digital asset 702 in storage 755.

In an example, the verification system 155 may generate first key 704 and second key 715 based on the encryption key 703. The encryption key 703 may be generated based on a random number or a random number with a salt based on a hash of the digital asset 702. The encryption key 703 may be divided into key shares using the multi-party key share mechanism and shared among one or more entities upon creation of digital asset 702 or when there is a change in the rights associated with the digital asset 702. For example, the digital asset 702 may be associated with an author, an owner, a licensee, a derivative work, and the like. The encryption key 703 may be shared among the entities that interact with the digital asset 702 to authenticate the digital asset 702 and distribute the rights profile 805 associated with the digital asset 702. In an example, the multiple party key share may be used to regenerate the encryption key 703 when the one or more entities share keys that are above a threshold number of keys. In an example, the first key 704 belongs to the first entity 110 and the second key 715 is stored with the verification system 155 to authenticate the digital asset 702, manage the authentication of the digital asset 702, allow recovery of keys, management of keys and to enhance the trust around the digital asset 702.

The verification system 155 may send the first key 704 to client device 120 of the first entity 110 and the second key 715 may be stored on the verification system 155. In an example, the verification system 155 may store the first key 704 in a secure format and manage the keys for the first entity 110. In an example, the first key 704 may be sent to client device 120 of the first entity 110 and the first entity 110 may be asked to explicitly authenticate the digital asset 702 or the rights profile 805 by generating a first verification key 706 based on the first key 704.

The verification system 155 may receive a request to authenticate the rights profile 805 or the attestation. For example, the verification system 155 may receive a request to authenticate the attestation from client device 125 of a second entity 115, e.g., a purchaser of the digital asset 702. For example, digital asset 702 may be displayed for sale on a distributed ledger, or a marketplace associated with the distributed ledger, and the second entity may determine to purchase digital asset 702 using client device 125. The distributed ledger or marketplace may provide an interface to client device 125 to verify the digital asset 702 via verification system 155.

The verification system 155 may recreate the encryption key 703 based on the first key 704 and the second key 715. The verification system 155 may request a first verification key 706 from client device 120 of the first entity 110. As discussed above, client device 120 may generate second verification key 716 based on the second key 715. Verification system 155 may then recreate the encryption key 703 using first verification key 706 and second verification key 716 to authenticate rights profile 805 or the attestation.

In an example, the rights profile 805 associated with the digital asset 702 may include a first identifier associated with an ownership of the digital asset 702, and the second identifier associated with the author of the digital asset 702. The first identifier and the second identifier may be associated with the first entity 110 during and after the minting of the digital asset 702. The verification system 155 may update the second identifier associated with the ownership of the digital asset 702 based on a sale transaction.

The verification system 155 may receive a request to authenticate the digital asset 702 available for purchase on a digital marketplace associated with the blockchain network 130a. The verification system 155 may determine a transaction on the blockchain network 130a that created the digital asset 702. The verification system 155 may determine the set of multiparty keys associated with the digital asset 702 to recreate the encryption key 703 based on the original transaction associated with the creation of the digital asset 702. In an example, the digital asset 702 may include additional key shares when the digital asset 702 is sold via the first sale token. The verification system 155 may determine whether the owner of the digital asset 702 available for sale on the digital marketplace has ownership rights, based on the coefficient of the polynomial equation and a degree or position of the coefficient in the polynomial received from the owner. The verification system 155 may request and receive a coefficient of the polynomial equation and extrapolate the polynomial equation and generate the encryption key based on the extrapolated polynomial equation. The verification system 155 may authenticate the digital asset 702 based on the digital signature of the digital asset 702. Further, the verification system 155 may determine a chain of transactions from the first sale token to a sale token associated with an owner such as the resale entity, where the chain of transaction includes tokens associated with the sale of the digital asset 702. The verification system 155 may determine the chain of transactions based on information available on the blockchain network 130a to authenticate the chain of transactions from the current token offering the digital asset 702 available for sale to the original token creating the digital asset 702. In an embodiment, the verification system 155 may store information such as the keys added or removed, and the tokens associated with the digital asset 702 over the entire history of the digital asset 702 in a database and authenticate the chain of ownership associated with the digital asset 702 based on the information about the key shares.

Figure 8B:
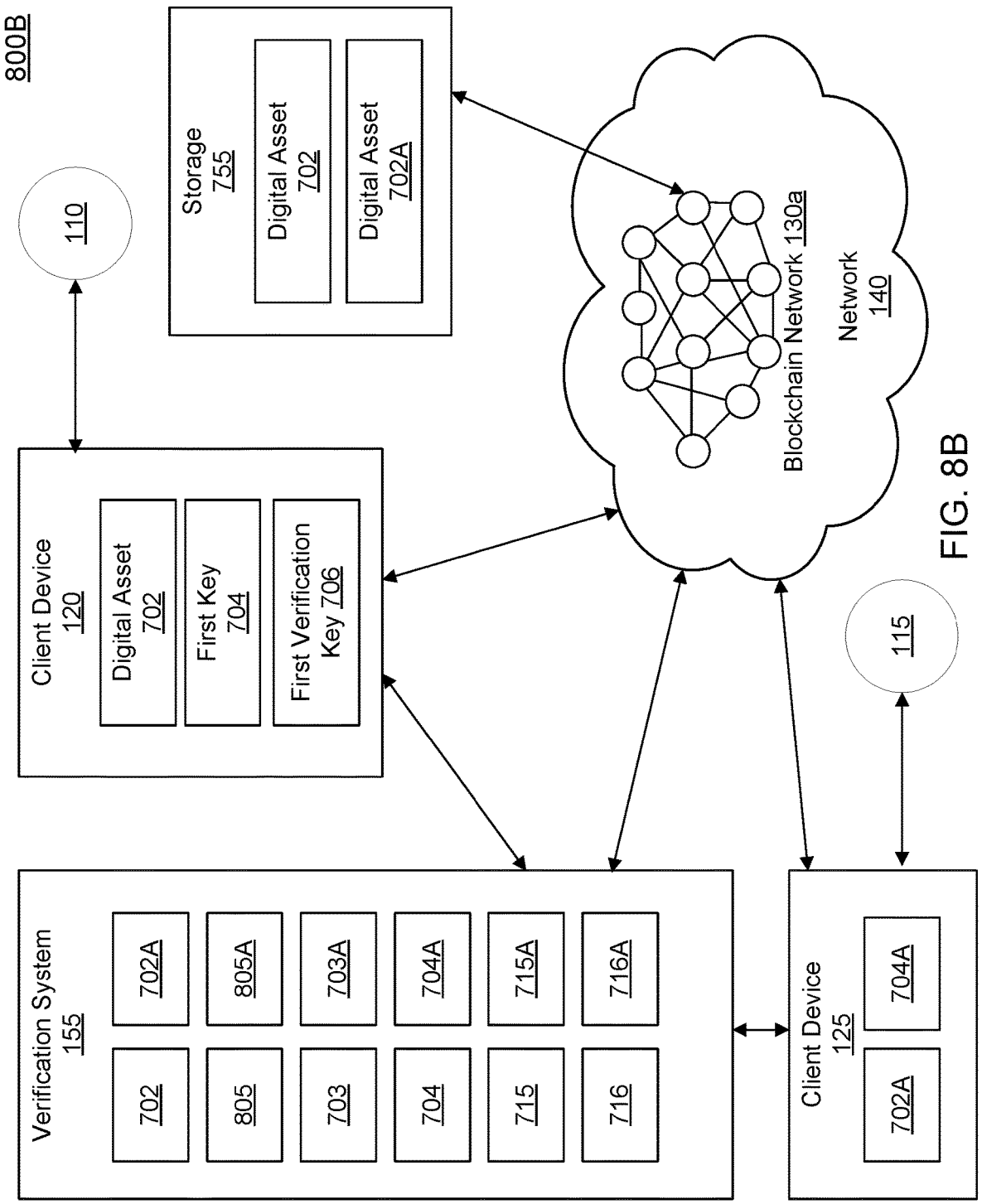
FIG. 8B is a block diagram of an environment that authenticates a derivative work of a digital asset using multi-party key authentication, according to an embodiment.

FIG. 8B is a block diagram 800B illustrating an environment that authenticates a derivative of a digital asset 702 using multi-party key authentication, according to some embodiments. In some instances, verification system 155 may generate shared keys for a derivative work of digital asset 702. Suppose first entity 110 is an author of digital asset 702 and second entity 115 is an owner of digital asset 702. Verification system 155 may receive a request from client device 125 of the second entity 115 to create a second digital asset 702A, that may be a derivative work based on the digital asset 702. The verification system 155 may also determine the rights associated with the digital asset 702 in the rights profile 805 based on the first verification key 706 regenerated using the first key 704 and the second verification key 716 regenerated from second key 715. In response to accessing the rights profile 805 and determination that the second entity 115 may create a derivative work, the verification system 155 may generate a derivative encryption key 703A and sign the second digital asset 702A based on the derivative encryption key 703A. In addition, the verification system 155 may generate a rights profile 805A based on the first digital rights profile 805. The verification system 155 may associate the rights profile 805A with the second digital asset 702A via a token signed with the derivative key 703A that links the rights profile 805A to an address associated with the first entity 110, the second entity 115 or both. In some embodiments, the verification system 155 may store the rights profile 805A to facilitate authentication. In an example, the derivative encryption key 703A may be based on an encryption key of the first entity 110 and an encryption key of the second entity 115. In an example, the verification system 115 may divide the derivative encryption key 703A into key shares based on the polynomial function of the digital asset 702. For example, the verification system may divide the derivative key 703A by adding additional keys for the derivative work, to protect the derivative encryption key 703A. The verification system 155 may also generate the rights profile 805A based on the rights profile 805 of the digital asset 702, and the information associated with the second entity 115. Additionally, verification system 155 may divide derivative encryption key 703A into shares to generate first key 704A and transmit first key 704A to client device 125 associated with second entity 115, and second key 715A and second verification key 716 to be stored securely within verification system 155.

In response to a determination that the second entity 115 may not create a derivative work, the verification system 155 can execute instructions associated with the digital asset 702. The instructions associated with the digital asset 702 may be part of the smart contract or token on a distributed ledger and may be accessible using the rights profile 805. The instructions associated with the digital asset 702 may limit use or access to the digital asset 702, prevent entity 115 from generating digital asset 702A, revoke access to the digital asset 702, or revoke the sale of the digital asset 702.

Figure 9:
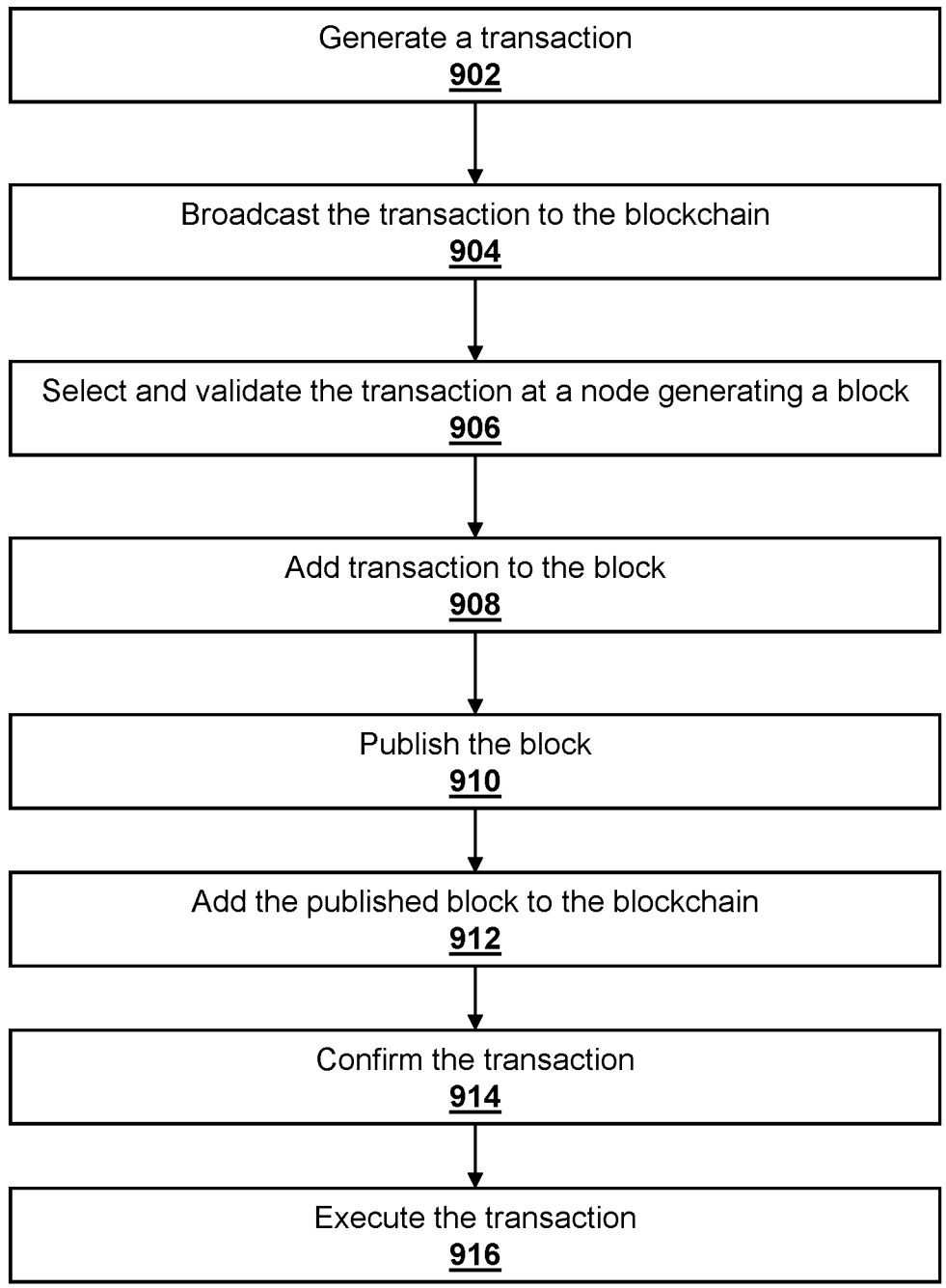
FIG. 9 is a flowchart of a method for performing a transaction that adds a block to a blockchain, according to an embodiment.

FIG. 9 is a flow diagram of a method 900 for performing a transaction that adds a block to a blockchain, according to some embodiments. An example transaction may be between entities, such as the first entity 110 associated with client device 120 and the second entity 115 associated with client device 125. Method 900 may be performed by the computing devices, or a combination of computing devices shown in FIGS. 1-8. Steps 902-916 of method 900 may be modified, omitted, and/or performed in other orders, and/or other steps added. Prior to step 902, first entity 110 may create digital asset 702 and store digital asset 702 in storage 755. Verification system 155 may generate encryption key 703 to sign the digital asset 702 and create a digital signature. Verification system 155 may also indicate that first entity 110 is the author of digital asset 702.

At step 902, a transaction is generated. The verification system 155 may generate a transaction, such as a smart contract for transferring ownership of the digital asset 702 from the first entity 110 to the second entity 115. As discussed with reference to FIG. 4, the transaction may include information, such as a blockchain address of the sender 430 (e.g., blockchain address of verification system 155), the digital signature 455 (digital signature of digital asset 702 generated using the encryption key 703), transaction output information 460, and the public key of the sender 430. Further as discussed above with reference to FIG. 6, the transaction may be based on a smart contract, and the verification system 155 may sign the smart contract using the encryption key 703. The transaction data may be combined and sent as a transaction to the first server 150 from verification system 155 or via client device 120.

At step 904, a transaction may be broadcasted. The first server 150 may broadcast the transaction to the blockchain network 130a. The transaction may be received by one or more nodes 205 of the blockchain network 130a.

At step 906, a transaction may be selected and validated. Upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205 (not shown). Validating the transaction may include determining whether the transaction is legal or conforms to a pre-defined set of rules for that transaction, establishing entity authenticity, and establishing transaction data integrity.

At step 908, a transaction is added to a block. Once the transaction is successfully validated by node 205, the validated transaction is added to a block in blockchain network 130a being constructed by that node 205. As discussed above, since different nodes 205 may choose to validate different transactions, different nodes 205 may build or assemble a block comprising different validated transactions. Thus, the transaction associated with the first entity 110 transferring the digital asset 702 to the second entity 115 may be included in some blocks and not others.

At step 910, the block is published. Validated transactions may be added to the block being assembled by node 205 until it reaches a minimum size specified by the blockchain. If the blockchain network 130a utilizes a proof of work consensus model, then the nodes 205 may compete for the right to add their respective blocks to the blockchain by solving a complex mathematical puzzle The node 205 that solves its puzzle first wins the right to publish and publishes its block. For simplicity, the block that includes the transaction is published.

At step 912, the published block is added to the blockchain network 130a. The published block is broadcasted to nodes 205 for validation. Once the block is validated by a majority of the nodes 205, the validated block is added to the blockchain 220 in blockchain network 130a.

At step 914, the transaction is confirmed. Once the transaction is added to the blockchain 220, the first server 150 may wait to receive a minimum number of blockchain confirmations for the transaction.

At step 916, the transaction is executed. Once the minimum number of confirmations have been received, the transaction may be executed and the smart contract to sell the digital asset 702 from the first entity 110 to the second entity 115 may be placed on the blockchain. For example, the digital asset 702 owned by the first entity 110 may be transferred from the digital wallet in client device 120 of the first entity 110 to the digital wallet in client device 125 of the second entity 115. The smart contract may be addressed using the address location where the smart contract is stored on the blockchain network 130a. The second entity 115 may interact the with the smart contract via the address location to indicate transfer of payments, and the like. In an embodiment, the second entity 115 via client device 125 may use the verification system 155 to request verification of the digital asset 702. The second entity 115 may use an application programming interface of the verification system 155 to verify the authenticity of the digital asset 702.

Figure 10:
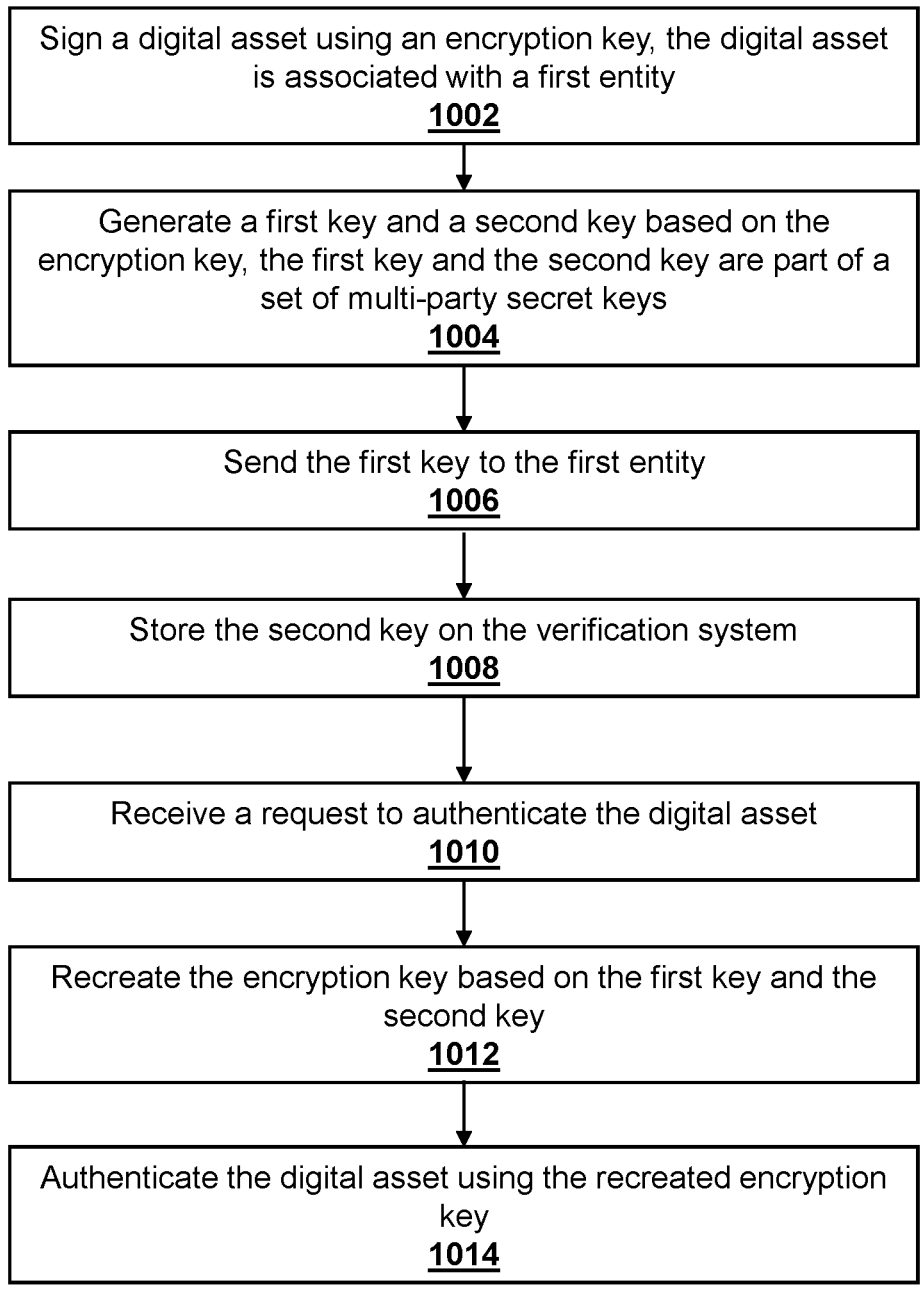
FIG. 10 is a flowchart of a method for a multi-party key authentication of a digital asset, according to an embodiment.

FIG. 10 illustrates a flowchart of a method 1000 for authenticating a digital asset 702 using a multi-party key authentication, according to an embodiment. Note that one or more steps, processes, and methods described in steps 1002-1014 of method 1000 may be omitted, performed in a different sequence, or combined as desired or appropriate.

At step 1002, the digital asset 702 may be signed using an encryption key 703 associated with the digital asset 702. The verification system 155 may generate encryption key 703 and sign digital asset 702 with encryption key 703. The encryption key 703 may be a cryptographic key which is generated from a random number when the verification system 155 is provided access to the digital asset 702 stored in, e.g., storage 755. Digital asset 702 may be associated with first entity 110 where first entity 110 may be an author or owner of digital asset 702. Typically, step 1002 may occur when digital asset 702 is created.

At step 1004, a first key 704 and a second key 715 are generated. Verification system 155 may generate first key 704 and second key 715 based on encryption key 703. As discussed above, encryption key 703 may be divided into key shares, such as first key 704 and second key 715, among one or more entities that are part of a multiparty key share. Encryption key 703 may be divided when there is a change in the rights associated with the digital asset 702. In an example, the first key 704 may belong to the first entity 110 who may be an author or an owner and the second key 715 may be stored with the verification system 155. Typically, step 1004 may occur when digital asset 702 is created.

At step 1006, the first key 704 is sent to client device 120 of the first entity 110. The verification system 155 may securely send the first key 704 to client device 120 of the first entity 110.

At step 1008, the second key 715 is stored on verification system 155. The verification system 155 stores the second key 715 securely within verification system 155.

At step 1010, a request to authenticate the digital asset 702 is received. As discussed above, first entity 110 may be asked to authenticate the digital asset 702 prior or during the transaction discussed in FIG. 9 that transfers ownership of digital asset 702 from the first entity 110 to the second entity 115. Verification system 155 may receive a request to authenticate the digital asset 702. For example, the second entity 115 may, via client device 125, find the digital asset 702 for sale in a marketplace and use an interface provided in the marketplace to verify the digital asset 702. In another example, verification system 155 may receive a request to authenticate digital asset 702 from client device 125 of second entity 115.

At step 1012, the encryption key 703 may be recreated based on the first key 704 and the second key 715. The verification system 155 may request and receive a first verification key 706 from client device 120 of the first entity 110. The first verification key 706 may be generated based on first key 704. The verification system 155 may generate a second verification key 716 based on the second key 715. The first verification key 706 and the second verification key 716 may be based on the corresponding secret key which may include a number and a polynomial equation that is unique. Verification system 155 may use the first verification key 706 and the second verification key 716 to recreate the encryption key 703.

At step 1014, the digital asset 702 is authenticated using the recreated encryption key 703. For example, Once authenticated, the digital asset 702 may be transferred from first entity 110 to second entity 115 and the transaction in FIG. 9 completes.

Figure 11:
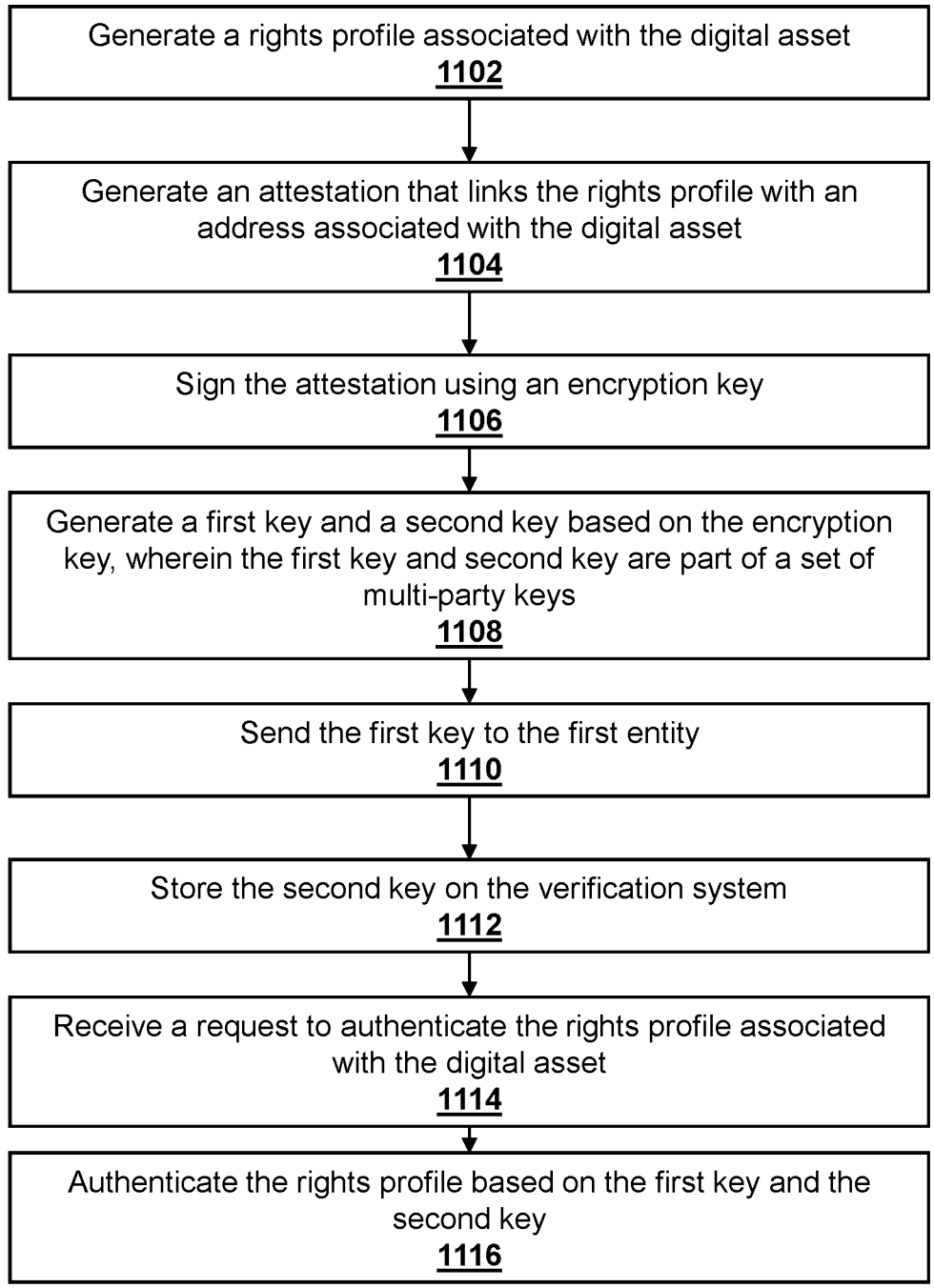
FIG. 11 illustrates a flowchart of a method for a multi-party key authentication of a rights profile of a digital asset, according to an embodiment.

FIG. 11 illustrates a flowchart of a method 1100 for a multi-party key authentication of a rights profile 805 of digital asset 702, according to an embodiment. Note that one or more steps, processes, and methods described in steps 1102-1116 of method 1100 may be omitted, performed in a different sequence, or combined as desired or appropriate.

At step 1102, a rights profile 805 associated with the digital asset 702 is generated. Verification system 155 may generate rights profile 805 associated with digital asset 702. The rights profile 805 may include information associated with an author of the digital asset 702, an owner of the digital asset 702, information about the bundle of rights that are transferred in a transaction associated with digital asset 702, information about whether derivative works are authorized, information about whether the digital asset 702 may be used in a public performance and the like.

At step 1104, an attestation that links the rights profile 805 with an address associated with the digital asset 702 or the first entity 110 is generated. The verification system 155 may generate the attestation. The attestation may link the rights profiles 805 to digital asset 702. For example, the rights profile 805 may be included in a smart contract that may be executed by a peer in a peer-to-peer network mining the blockchain. The smart contract may include the rights profile 805, and the verification system 155 may generate a token that includes the rights profile 805 to allow authentication of the rights that may be associated with digital asset 702.

At step 1106, the attestation may be signed using the encryption key 703. As discussed above, verification system 155 may generate encryption key 703. Once generated, verification system 155 may sign the attestation using encryption key 703.

At step 1108, a first key 704 and a second key 715 are generated. As discussed above, encryption key 703 may be divided into multiple key shares and shared among one or more entities, such as first key 704 and second key 715. For example, the digital asset 702 may be associated with different entities, such as an author, an owner, a licensee, a creator of the derivative work, etc. Key shares of encryption key 703 may be distributed to different entities and may be used to verify rights associated with the digital asset 702 as specified in rights profile 805. For example, first key 704 may be associated with the first entity 110 and the second key 715 is stored with the verification system 155.

At step 1110, the first key 704 may be sent to the first entity 110. Verification system 155 may send first key 704 to client device 120 of the first entity 110.

At step 1112, the second key 715 may be stored on the verification system 155. Verification system 155 may store the first key 704 in a secure format and manage the keys for the first entity 110.

At step 1114, a request to authenticate the rights profile 805 is received. Verification system 155 may receive a request to authenticate the attestation from client device 125 of second entity 115, e.g., a purchaser of digital asset 702. Second entity 115 may request a verification of available rights associated with digital asset 702 or a particular right, such as whether a derivative work may be created from digital asset 702. Whether a derivative work may be created may be specified in the rights profile 805.

At step 1116, rights profile 805 is authenticated based on the first key 704 and the second key 715. First entity 110 may be asked to authenticate the rights profile 805 by generating first verification key 706 based on the first key 704 on client device 120. The verification system 155 may request first verification key 706 from the first entity 110. In an example, the verification system 155 may generate a second verification key 716 based on the second key 715. The first verification key 706 and the second verification key 716 may recreate encryption key 703 generated in step 1102. If the recreated encryption key 703 matches the encryption key 703 that was used to sign the attestation in step 1106, the attestation may be obtained, and the rights profile 805 may be accessed from the attestation. Verification system 155 may return the rights that are available in rights profile 805 or a particular rights, such as whether a derivative work of digital asset 702 may be created. In an example, the verification system 155 may determine based on the parameters such as the instructions in the smart contract, whether a derivative work is authorized.

Figure 12:
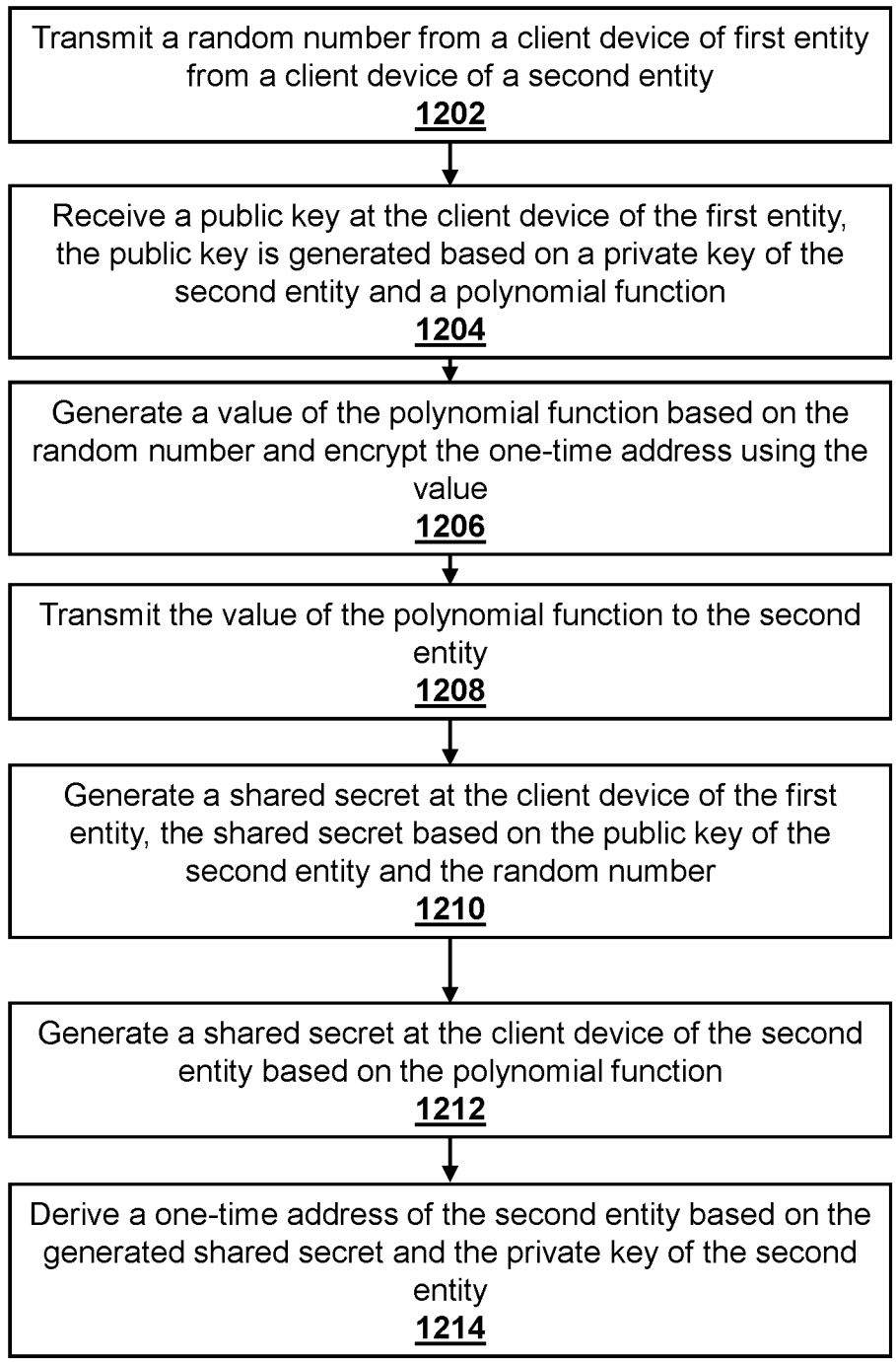
FIG. 12 illustrates a flowchart of method for a multi-party key authentication exchange of a one-time address, according to an embodiment.

FIG. 12 illustrates a flowchart of a method 1200 for creating a one-time address, according to an embodiment. Note that one or more steps, processes, and methods described herein of method 1200 may be omitted, performed in a different sequence, or combined as desired or appropriate. A one-time address may be created by client devices 120, 125, verification system 155, etc., to exchange a one-time address that may be used to transfer digital assets, to ensure privacy during transfer of digital assets by protecting the private address associated with entities, etc.

At step 1202, a random number n is transmitted. Client device 120 of the first entity 110 may generate a random number n for a transaction associated with the digital asset 702 and transmit the number n to the client device 125 of second entity 115.

At step 1204, a public key is received. Client device 125 of second entity 115 may send a public key Q to client device 120 of the first entity 110. The public key Q may be generated based on the private key associated with the second entity 115 and a polynomial equation G, i.e., shared polynomial equation. The public key Q may be generated as public key Q=s*G, where s is the recipient's private key and G is a shared polynomial equation.

At step 1206, a value for a polynomial function is generated. Client device 120 of the first entity 110 may encrypt the one-time address for the transaction based on the polynomial secret function G and a random number n. For example, client device 120 of the first entity 110 may determine a value P of polynomial G, based on the number n as follows, $$P=n*G.$$

At step 1208, client device 120 of the first entity 110 may transmit the value P to the client device 125 of second entity 115.

At step 1210, a shared secret Φ is created based on the public key Q. Client device 120 of the first entity 110 may create a shared secret Φ based on the public key Q shared by the first entity 110 and the number n, such as Φ=n*Q At step 1212, a shared secret Φ is generated based on the polynomial function P. Client device 125 of second entity 115 may generate the shared secret Φ based on the polynomial P and the private key of the second entity, as follows:

$$\Phi = P * s$$
$$= n * Q * s$$
$$= n * s * G * s$$
$$= n * s * G$$

At step 1214, a one-time address is derived. Client device 125 of the second entity 115 may derive the one-time address based on the shared secret Φ and the private key associated with the second entity 115. For example, client device 125 may use the private key (s+Φ) or (s+(n*s*G)) to determine the one-time address Q' based on the public key Q.

$$Q' = (Q + \Phi) * G$$
$$= (s * G + \Phi) * G$$
$$= (s + \Phi) * G$$

Figure 13:
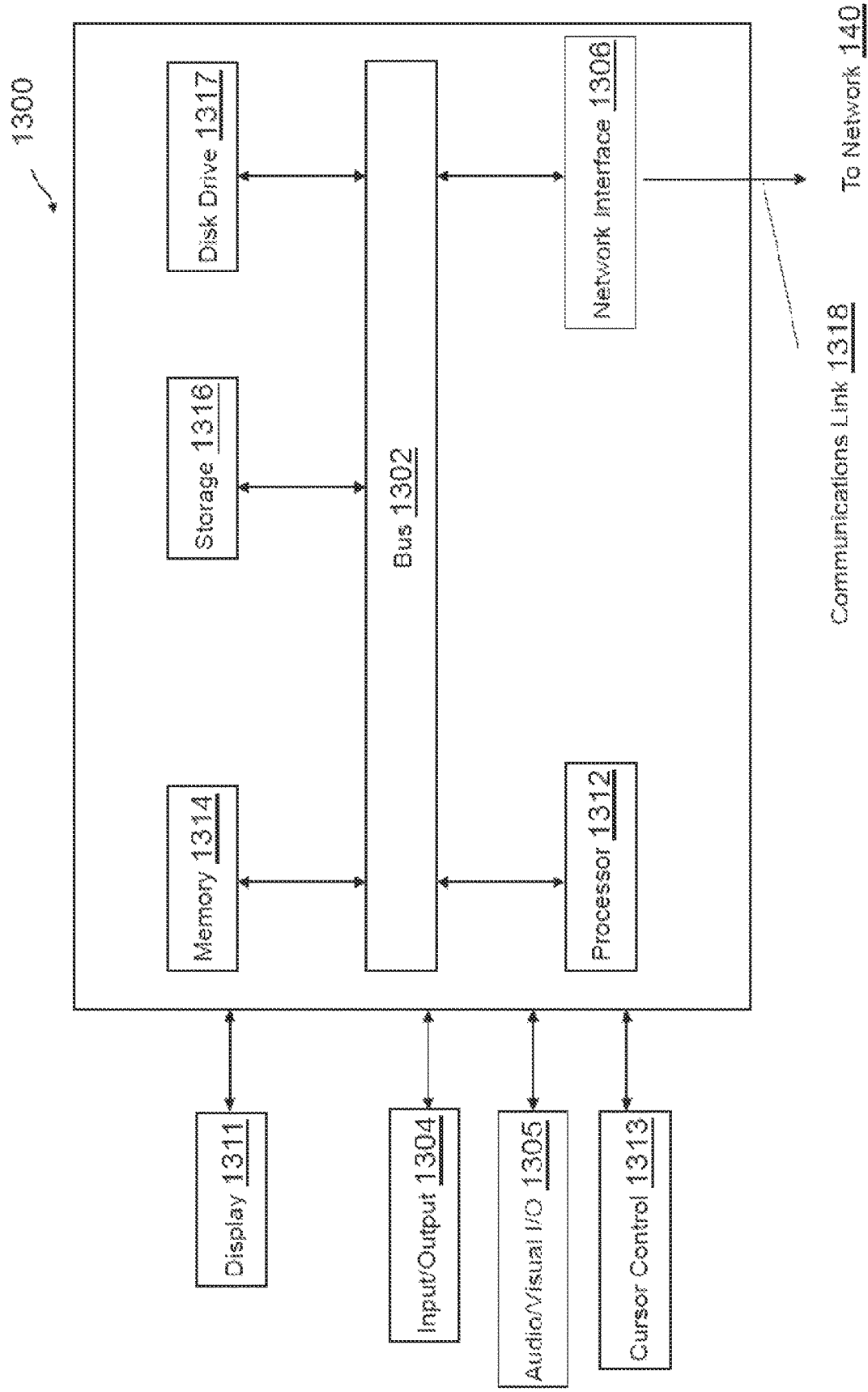
FIG. 13 illustrates a block diagram of a computer system suitable for implementing one or more components and methods of FIGS. 1-12, according to an embodiment.

FIG. 13 is a block diagram of a computer system 1300 suitable for implementing one or more components or methods in FIG. 1-12, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by entities and service providers may be implemented as computer system 1300 in a manner as follows.

Computer system 1300 includes a bus 1302 or other communication mechanism for communicating information data, signals, and information between various components of computer system 1300. Components include an input/output (I/O) component 1304 that processes an entity action, such as selecting keys from a keypad/keyboard, selecting one or more buttons, image, or links, and/or moving one or more images, etc., and sends a corresponding signal to bus 1302. I/O component 1304 may also include an output component, such as a display 1311 and a cursor control 1313 (such as a keyboard, keypad, mouse, etc.). An optional audio input/output component 1304 may also be included to allow an entity to use voice for inputting information by converting audio signals. Audio I/O component 1305 may allow the entity to hear audio. A transceiver or network interface 1306 transmits and receives signals between computer system 1300 and other devices, such as another communication device, service device, or a service provider server via network 140, such as network 140 of FIGS. 1, 7, and 8. In one embodiment, the transmission is wireless, although other transmission mediums and methods may also be suitable. One or more processor(s) 1312, which can be a micro-controller, digital signal processor (DSP), or other processing component, processes these various signals, such as for display on computer system 1300 or transmission to other devices via a communication link 1318. Processor(s) 1312 may also control transmission of information, such as cookies or IP addresses, to other devices.

Components of computer system 1300 also include a system memory component 1314 (e.g., RAM), a static storage component (e.g., ROM), and/or a disk drive 1317. Computer system 1300 performs specific operations by processor(s) 1312 and other components by executing one or more sequences of instructions contained in system memory component 1314. Logic may be encoded in a computer readable medium, which may refer to any medium that participates in providing machine-readable instructions to processor(s) 1312 for execution. Such a medium may take many forms, including but not limited to, non-volatile media, volatile media, and transmission media. In various embodiments, non-volatile media includes optical or magnetic disks, volatile media includes dynamic memory, such as system memory component 1314, and transmission media includes coaxial cables, copper wire, and fiber optics, including wires that comprise bus 1302. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 1300. In various other embodiments of the present disclosure, a plurality of computer systems 1300 coupled by communication link 1318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A verification system comprising:
a non-transitory memory; and
one or more hardware processors coupled to the non-transitory memory and configured to read instructions from the non-transitory memory to cause the verification system to perform operations comprising:
signing a digital asset using an encryption key, wherein the digital asset is associated with a first entity;
generating a first key and a second key from the encryption key, wherein the first key and the second key are part of a set of multi-party secret keys, wherein the first key is associated with the first entity and the second key is stored in the verification system;
sending the first key to the first entity;
receiving a request to authenticate the digital asset;
receiving a first verification key from the first entity, whereby the first verification key is generated from the first key;
generating a second verification key at the verification system from the second key;
re-generating the encryption key using the first verification key and the second verification key; and
authenticating the digital asset with the re-generated encryption key, by matching the encryption key to the re-generated encryption key.

2. The verification system of claim 1, wherein the digital asset comprises a non-fungible token (NFT).

3. The verification system of claim 1, wherein the first key is associated with a creator of the digital asset.

4. The verification system of claim 1, wherein the first key is associated with an owner of the digital asset.

5. The verification system of claim 1, wherein the operations further comprise:
determining that one of keys in the set of multi-party secret keys is compromised;
revoking the set of multi-party secret keys; and
generating a replacement set of multi-party secret keys for the digital asset.

6. The verification system of claim 1, wherein the request to authenticate is from a second entity and upon an authentication of the digital asset, the operations further comprise:
generating a third key for the digital asset, wherein the third key is associated with the second entity and a first sale transaction, and wherein the third key is part of the set of multi-party secret keys;
generating a first sale token associated with the digital asset based on the third key; and
associating the digital asset via the first sale token within a blockchain.

7. The verification system of claim 6, wherein the first sale transaction involves the digital asset being purchased by the second entity from the first entity.

8. The verification system of claim 1, wherein the operations further comprise:
generating a third key for a second digital asset associated with a third entity, wherein the third key is part of the set of multi-party secret keys, and the second digital asset is a derivative of the digital asset;
generating a derivative encryption key based on at least the first key and the second key; and
signing the second digital asset using the derivative encryption key.

9. The verification system of claim 8, wherein the operations further comprise:
determining that the second digital asset is not an authorized derivative work of the digital asset based on a parameter associated with a first sale token;
retrieving instructions associated with the digital asset; and
executing the instructions associated with the digital asset, wherein the instructions limit use of the second digital asset.

10. The verification system of claim 8, wherein the operations further comprise:
determining that the second digital asset is not an authorized derivative work of the digital asset based on a parameter associated with a first sale token; and
revoking a sale of the digital asset.

11. The verification system of claim 1, wherein the operations further comprise:
generating a rights profile associated with the digital asset, wherein the rights profile includes a first identifier associated with an ownership of the digital asset and a second identifier associated with an author of the digital asset;

associating the first identifier and the second identifier with the first entity; and updating the second identifier associated with the ownership of the digital asset based on a sale transaction.

12. The verification system of claim 1, wherein the operations further comprise:

generating a first attestation associated with the digital asset, wherein the first attestation links the digital asset with an address associated with the first entity on a blockchain; and signing the first attestation with the encryption key.

13. The verification system of claim 1, wherein the operations further comprise:

determining a first address on a blockchain associated with the first entity;

determining a history of transactions on the blockchain associated with the first address; and determining a risk score associated with the digital asset based on at least one of the first address or the history of transactions on the blockchain.

14. The verification system of claim 1, wherein the operations further comprise:

receiving a second request to authenticate the digital asset available for purchase from a resale entity;

determining a chain of transactions from a first sale token associated with the digital asset to a sale token associated with the resale entity, wherein the chain of transactions includes tokens associated with a sale of the digital asset;

authenticating the chain of transactions based on the set of multi-party secret keys and on at least one step in the chain of transactions; and authenticating an origin of the digital asset based on the authenticated chain of transactions.

15. The verification system of claim 1, wherein the operations further comprise:

generating a third key for the digital asset associated with a second entity and a first sale transaction, wherein the third key is part of the set of multi-party secret keys;

generating a first sale token associated with the digital asset based on the third key;

updating a rights profile associated with the digital asset based on the first sale token; and authenticating an ownership associated with the digital asset based on at least the third key.

16. The verification system of claim 1, further comprising:

signing a response to the request using the re-generated encryption key; and transmitting the signed response to an entity that issued the request, whereby the signed response and the signed digital asset are decrypted using a counterpart of the encryption key, and whereby the digital asset is authenticated once the signed digital asset and the signed response are decrypted with the counterpart of the encryption key.

17. A method, comprising:

signing, using a processor, a digital asset using an encryption key, wherein the digital asset is associated with a first entity;

generating, using the processor, a first key and a second key from the encryption key, wherein the first key and the second key are part of a set of multi-party secret keys, wherein the first key is associated with the first entity and the second key is stored in a verification system;

sending the first key to the first entity;

receiving a request to authenticate the digital asset;

receiving a first verification key from the first entity, whereby the first verification key is generated from the first key;

generating a second verification key at the verification system from the second key;

re-generating the encryption key using the first verification key and the second verification key; and authenticating the digital asset with the re-generated encryption key, by matching the encryption key to the re-generated encryption key.

18. The method of claim 17, wherein the digital asset comprises a non-fungible token (NFT).

19. The method of claim 17, wherein the first key is associated with a creator of the digital asset or an owner of the digital asset.

20. The method of claim 17, further comprising:

determining that one of keys in the set of multi-party secret keys is compromised;

revoking the set of multi-party secret keys; and generating a replacement set of multi-party secret keys for the digital asset.

* * * * *